(12) United States Patent
Huang et al.

(10) Patent No.: US 12,213,155 B2
(45) Date of Patent: Jan. 28, 2025

(54) INTEGRATED ACCESS AND BACKHAUL NODE RESOURCE TIMING

(71) Applicant: Telefonaktiebolaget LM Ericsson (publ), Stockholm (SE)

(72) Inventors: Yezi Huang, Täby (SE); Erik Dahlman, Stockholm (SE); Boris Dortschy, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 285 days.

(21) Appl. No.: 17/630,590

(22) PCT Filed: Jul. 30, 2020

(86) PCT No.: PCT/EP2020/071545
§ 371 (c)(1),
(2) Date: Jan. 27, 2022

(87) PCT Pub. No.: WO2021/023623
PCT Pub. Date: Feb. 11, 2021

(65) Prior Publication Data
US 2022/0264565 A1      Aug. 18, 2022

Related U.S. Application Data

(60) Provisional application No. 62/881,997, filed on Aug. 2, 2019.

(51) Int. Cl.
*H04W 72/04* (2023.01)
*H04W 72/0446* (2023.01)
(Continued)

(52) U.S. Cl.
CPC ....... *H04W 72/27* (2023.01); *H04W 72/0446* (2013.01); *H04W 72/1263* (2013.01); *H04W 88/14* (2013.01); *H04W 92/20* (2013.01)

(58) Field of Classification Search
CPC ..... H04W 72/04; H04W 72/12; H04W 56/00; H04W 72/02; H04W 72/20; H04W 72/21;
(Continued)

(56) References Cited

U.S. PATENT DOCUMENTS 11,082,941 B2 *  8/2021  Abedini ............ H04W 74/0833
11,477,811 B2 * 10/2022  Islam ................ H04W 56/0045
(Continued)

FOREIGN PATENT DOCUMENTS

WO       2020204776 A1    10/2020

OTHER PUBLICATIONS

"3rd Generation Partnership Project; Technical Specification Group Radio Access Network; NR; Physical channels and modulation (Release 15)", 3GPP TS 38.211 V15.4.0, Dec. 2018, 96 pages.
(Continued)

*Primary Examiner* — Man U Phan
(74) *Attorney, Agent, or Firm* — Murphy, Bilak & Homiller, PLLC

(57) ABSTRACT

Methods and apparatus are provided for determining timing of resources in an integrated access and backhaul, IAB, node (200). In one example, a method (1300), is performed by an integrated access and backhaul, IAB, node (200), the method comprising: determining (s1302) one or more timing offset for a time resource, the offset being in relation to a mobile termination, MT, and a distributed unit, DU, resource of the IAB node, and providing (s1304) to a parent IAB node (300), information related to the one or more timing offset of the IAB node.

11 Claims, 18 Drawing Sheets

(51) Int. Cl.
*H04W 72/1263* (2023.01)
*H04W 72/27* (2023.01)
*H04W 88/14* (2009.01)
*H04W 92/20* (2009.01)

(58) Field of Classification Search
CPC ..... H04W 72/23; H04W 72/27; H04W 72/51; H04W 76/10; H04W 76/15; H04W 76/27; H04W 80/08; H04W 80/02; H04W 88/08; H04W 88/14; H04W 92/20; H04W 92/04; H04W 92/24; H04L 5/14; H04L 5/00; H04L 27/26; H04B 7/06; H04B 7/15
USPC ......................................................... 370/329
See application file for complete search history.

(56) References Cited

U.S. PATENT DOCUMENTS

| | | | | |
|---|---|---|---|---|
| 11,503,555 | B2 * | 11/2022 | Nam | H04W 56/0045 |
| 11,503,592 | B2 * | 11/2022 | Korhonen | H04W 56/0045 |
| 11,849,419 | B2 * | 12/2023 | Dahlman | H04W 88/14 |
| 11,902,926 | B2 * | 2/2024 | Miao | H04W 56/0045 |
| 2022/0070809 | A1 * | 3/2022 | Song | H04W 72/20 |
| 2022/0070810 | A1 * | 3/2022 | Bi | H04W 56/0015 |
| 2022/0182977 | A1 * | 6/2022 | Miao | H04W 72/51 |
| 2022/0183003 | A1 * | 6/2022 | Wei | H04W 72/0446 |
| 2022/0191893 | A1 * | 6/2022 | Miao | H04B 7/15542 |
| 2022/0353830 | A1 * | 11/2022 | Park | H04W 84/04 |
| 2023/0156635 | A1 * | 5/2023 | Nam | H04W 76/27 370/350 |

OTHER PUBLICATIONS

"3rd Generation Partnership Project; Technical Specification Group Radio Access Network; NR; Study on Integrated Access and Backhaul; (Release 16)", 3GPP TR 38.874 V16.0.0, Dec. 2018, 111 pages.

"DL transmission timing alignment for IAB", 3GPP TSG RAN WG1 Meeting #97, R1-1906002, Huawei, Reno, USA, May 13-17, 2019, 6 pages.

"DL transmission timing alignment for IAB", 3GPP TSG RAN WG1 Meeting #96bis, R1-1903939, Huawei, Xi'an, China, Apr. 8-12, 2019, 6 pages.

"IAB resource configuration and multiplexing", 3GPP TSG-RAN WG1 Meeting #97, R1-1906588, Ericsson, Reno, U.S., May 13-17, 2019, 9 pages.

"Summary of 7.2.3.4 Mechanism to support the "case-1" OTA timing alignment", 3GPP TSG RAN WG1 Meeting #97, R1-1907667, ZTE, Sanechips, Reno, USA, May 13-17, 2019, 15 pages.

* cited by examiner

*Spanning Tree*  *Directed Acyclic Graph*

INTEGRATED ACCESS AND BACKHAUL NODE RESOURCE TIMING

TECHNICAL FIELD

Embodiments herein relate generally to integrated access and backhaul nodes and, in particular, to timing of resources.

BACKGROUND

Densification via the deployment of more and more base stations (macro or micro base stations) is one of the mechanisms that can be employed to satisfy the ever-increasing demand for bandwidth/capacity in mobile networks. Due to the availability of more spectrum in the millimeter wave (mmw) band, deploying small cells that operate in this band is an attractive deployment option for these purposes. However, deploying fibre to the small cells, which is the usual way in which small cells are deployed, can end up being very expensive and impractical. Thus, employing a wireless link for connecting the small cells to the operator's network is a cheaper and practical alternative. One such solution is an Integrated Access and Backhaul (IAB) network, where the operator can utilize part of the radio resources for the backhaul link.

Integrated access and backhaul has been studied by the 3$^{rd}$ Generation Partnership Project (3GPP) in the scope of LongTerm Evolution (LTE) Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the user equipment (UE)s behind the RN and hide any UE mobility between Donor eNB and Relay Node on the same Donor eNB from the core network (CN).

During the Rel-10 work other architectures were also considered, e.g. where the RNs are more transparent to the Donor gNB and allocated a separate stand-alone P/S-GW node.

For 3GPP new radio (NR), similar architecture options can also be considered. One potential difference compared to LTE (besides lower layer differences) is that a NR base station (g node B) gNB-CU/DU (Centralized Unit/Distributed Unit) split is defined for NR, which allows a separation of time critical radio link control (RLC)/medium access control (MAC)/physical layer (PHY) protocols from less time critical radio resource control (RRC)/packet data control protocol (PDCP) protocols. Such a split could also be applied for the IAB case. Other differences anticipated in NR as compared to LTE with regards to IAB is the support of multiple hops as well as the support of redundant paths.

In FIG. 1, an example IAB deployment is presented, where the IAB donor node (in short IAB donor) has a wired connection to the core network and the IAB relay nodes (in short IAB nodes) are wirelessly connected using NR to the IAB donor, either directly or indirectly via another IAB node. The connection between IAB donor/node and UEs is called access link, whereas the connection between two IAB nodes or between an IAB donor and an IAB node is called backhaul link. The example shows two IAB nodes but in other examples only one IAB node may be deployed or multiple IAB hops or backhaul links. Furthermore, as shown in FIG. 2, the adjacent upstream node which is closer to the IAB donor node of an IAB node may be referred to as a parent node of the IAB node. The adjacent downstream node which is further away from the IAB donor node of an IAB node may be referred to as a child node of the IAB node. The backhaul link between the parent node and the IAB node may thus be referred to as the parent (backhaul) link, whereas the backhaul link between the IAB node and the child node may be referred to as a child (backhaul) link.

Currently in 3GPP, different architectures for supporting user plane traffic over IAB node has been considered in 3GPP TR 38.874 Version 16.0.0. Architecture option 1a is recommended and is depicted in FIG. 3. Architecture 1a leverages CU/DU-split architecture. FIG. 3 shows the reference diagram for a two-hop chain of IAB-nodes connected to an IAB-donor, where IAB-node and UE connect in stand-alone (SA)-mode to a next generation core (NGC).

In this architecture, each IAB-node includes a Mobile Termination (MT) and a distributed unit (DU). In an IAB node, the MT function is a logical unit which terminates the backhaul radio interface toward the IAB parent node. Via the MT, the IAB-node connects to an upstream IAB-node or the IAB-donor. Via the DU, the IAB-node establishes RLC-channels to UEs and to MTs of downstream IAB-nodes. For MTs, this RLC-channel may refer to a modified RLC, denoted RLC*. An IAB-node can connect to more than one upstream IAB-node or IAB-donor DU. The IAB-node may contain multiple DUs, but each DU part of the IAB-node has one F1-C connection only with one IAB-donor CU-CP.

The donor node also includes a DU to support UEs and MTs of downstream IAB-nodes. The IAB-donor includes one or more CU for the DUs of all IAB-nodes and for its own DU. It is assumed that the DUs on an IAB-node are served by or connected to only one IAB-donor. This IAB-donor node may change through topology adaptation. Each DU of an IAB-node connects to the CU in the IAB-donor using a modified form of F1, which is referred to as F1*. F1*-U runs over RLC channels on the wireless backhaul between the MT on the IAB-node and the DU on the donor. An adaptation layer is added, which holds routing information, enabling forwarding. It replaces the IP functionality of the standard F1-stack. F1*-U may carry a GPRS tunneling protocol user plane (GTP-U) header for the end-to-end association between CU and DU. In a further example, information carried inside the GTP-U header may be included into the adaption layer.

Further, adaptations to RLC may be considered such as applying ARQ only on the end-to-end connection as opposed to hop-by-hop. The right side of FIG. 3 shows two examples of such F1*-U protocol stacks. In this figure, enhancements of RLC are referred to as RLC*. The MT of each IAB-node further supports Non Access Stratum (NAS) connectivity to the next generation core network (NGC) e.g., for authentication of the IAB-node. It may further support a protocol data unit (PDU)-session via the NGC, e.g., to provide the IAB-node with connectivity to the OAM.

For non-stand-alone (NSA) operation with evolved packet core (EPC), the MT may be dual-connected with the network using E-UTRAN-NR Dual Connectivity (EN-DC). The IAB-node's MT may support a packet data network (PDN) connection with the EPC, e.g., to provide the IAB-node with connectivity to the OAM.

Wireless backhaul links are vulnerable to radio signaling blockage, e.g., due to moving objects such as vehicles, due to seasonal changes (foliage), or due to infrastructure changes (new buildings). Such vulnerability also applies to physically stationary IAB-nodes. Also, traffic variations can create uneven load distribution on wireless backhaul links leading to local link or node congestion.

IAB topologies which are considered in IAB deployments may be classified as:
1. Spanning tree (ST)
2. Directed acyclic graph (DAG)

FIG. 4 depicts examples for spanning tree and directed acyclic graph. The arrows indicate the directionality of the graph edge.

FIG. 5 shows examples of link and route redundancy in DAG. The following options can be considered:
- The IAB-node is multi-connected, i.e., it has links to multiple parent nodes (FIG. 5a).
- The IAB-node has multiple routes to another node, e.g. the IAB-donor (FIG. 5b).
- Both options can be combined, i.e., the IAB-node may have redundant routes to another node via multiple parents (FIG. 5c).

Multi-connectivity or route redundancy may be used for back-up purposes. It is also possible that redundant routes are used concurrently, e.g., to achieve load balancing, reliability, etc.

FIG. 6 shows route redundancy in architecture group 1 either using single MT function or multiple MT functions.

From an IAB-node MT point-of-view, as in 3GPP Rel. 15, the following time-domain resources can be indicated for the parent link:
- Downlink time resource (DL)
- Uplink time resource (UL)
- Flexible time resource (F)

From an IAB-node DU point-of-view, the child link can have the following types of time resources:
- Downlink time resource (DL)
- Uplink time resource (UL)
- Flexible time resource (F)
- Not available time resources (NA): resources not to be used for communication on the DU child links).

Each of the downlink, uplink and flexible time-resource types of the DU child link can belong to one of two categories:
- Hard (H): The corresponding time resource is always available for the DU child link,
- Soft (S): The availability of the corresponding time resource for the DU child link is explicitly and/or implicitly controlled by the parent node.

An IAB node may be configured with IAB-node specific resources in time available for the links. Mechanisms for scheduling coordination, resource allocation, and route selection across IAB-nodes/IAB-donors and multiple backhaul hops were studied in 3GPP TR 38.874 V16.0.0, including the following aspects:
- Distributed or centralized coordination mechanisms
- Resource granularity, adaptation period, and enhancements to existing mechanisms for the required signaling (e.g. slot or symbol-level or TDD configuration pattern) provided to the IAB node
- Explicit or implicit indication of the resources
- Exchange of L1 and/or L3 measurements between IAB-nodes
- Exchange of topology related information (e.g. hop order) impacting the study of the backhaul link physical layer design
- Resource (frequency, time in terms of slot/slot format, etc.) coordination which is faster than semi-static coordination and the indication of resources within the configuration which can be dynamically and flexibly used for different links, including:
  - The need to consider the scheduling delay, IAB node processing delays, or information required to be available for the use of flexible resources
  - Mechanisms to schedule flexible resources (e.g. GC-PDCCH)

In order to support mechanisms for resource allocation for IAB nodes, semi-static configuration is supported for the configuration of IAB node DU resources. In addition, dynamic indication (L1 signaling) to an IAB node of the availability of soft resources for an IAB node DU is supported. Existing Rel.15 L1 signaling methods are the baseline, while potential enhancements (e.g. new slot formats), rules for DU/MT behavior in case of conflicts across multiple hops, and processing time constraints at the IAB node may need to be considered, according to 3GPP TR 38.874 V16.0.0.

Table 1 and Table 2 capture the possible combinations of DU and MT behavior. The tables assume an IAB not capable of full-duplex operation. In the tables below the following definitions apply:
- "MT: Tx" means that the MT should transmit if scheduled;
- "DU: Tx" means that the DU may transmit;
- "MT: Rx" means that the MT should be able to receive (if there is anything to receive);
- "DU: Rx" means that the DU may schedule uplink transmissions from child nodes or UEs;
- "MT: Tx/Rx" means that the MT should transmit if scheduled and should be able to receive, but not simultaneously;
- "DU: Tx/Rx" means that the DU may transmit and may schedule uplink transmission from child nodes and UEs, but not simultaneously;
- "IA" means that the DU resource is explicitly or implicitly indicated as available;
- "INA" means that the DU resource is explicitly or implicitly indicated as not available;
- "MT: NULL" means that the MT does not transmit and does not have to be able to receive;
- "DU: NULL" means that the DU does not transmit and does not schedule uplink transmission from child nodes and UEs.

Table 1 applies in case of TDM operation, where there can be no simultaneous transmission in the DU and the MT, nor any simultaneous reception in the DU and the MT.

TABLE 1

DU and MT behaviour in case of TDM operation

| DU Configuration | MT configuration | | |
|---|---|---|---|
| | DL | UL | F |
| DL-H | DU: Tx<br>MT: NULL | DU: Tx<br>MT: NULL | DU: Tx<br>MT: NULL |
| DL-S | When DU resource: IA<br>DU: Tx<br>MT: NULL<br>When DU resource: INA<br>DU: NULL<br>MT: Rx | When DU resource: IA<br>DU: Tx<br>MT: NULL<br>When DU resource: INA<br>DU: NULL<br>MT: Tx | When DU resource: IA<br>DU: Tx<br>MT: NULL<br>When DU resource: INA<br>DU: NULL<br>MT: Tx/Rx |
| UL-H | DU: Rx<br>MT: NULL | DU: Rx<br>MT: NULL | DU: Rx<br>MT: NULL |
| UL-S | When DU resource: IA<br>DU: Rx<br>MT: NULL | When DU resource: IA<br>DU: Rx<br>MT: NULL | When DU resource: IA<br>DU: Rx<br>MT: NULL |

TABLE 1-continued

DU and MT behaviour in case of TDM operation

| DU Configuration | MT configuration | | |
|---|---|---|---|
| | DL | UL | F |
| | When DU resource: INA DU: NULL MT: Rx | When DU resource: INA DU: NULL MT: Tx | When DU resource: INA DU: NULL MT: Tx/Rx |
| F-H | DU: Tx/Rx MT: NULL | DU: Tx/Rx MT: NULL | DU: Tx/Rx MT: NULL |
| F-S | When DU resource: IA DU: Tx/Rx MT: NULL When DU resource: INA DU: NULL MT: Rx | When DU resource: IA DU: Tx/Rx MT: NULL When DU resource: INA DU: NULL MT: Tx | When DU resource: IA DU: Tx/Rx MT: NULL When DU resource: INA DU: NULL MT: Tx/Rx |
| NA | DU: NULL MT: Rx | DU: NULL MT: Tx | DU: NULL MT: Tx/Rx |

Table 2 applies in case of SDM operation, where there can be simultaneous transmission in the DU and the MT, alternatively simultaneous reception in the DU and the MT.

TABLE 2

DU and MT behavior in case of SDM operation

| | DL | UL | F |
|---|---|---|---|
| DL-H | DU: Tx MT: NULL | DU: Tx MT: Tx | DU: Tx MT: Tx |
| DL-S | When DU resource: IA DU: Tx MT: NULL When DU resource: INA DU: NULL MT: Rx | When DU resource: IA DU: Tx MT: Tx When DU resource: INA DU: NULL MT: Tx | When DU resource: IA DU: Tx MT: Tx When DU resource: INA DU: NULL MT: Tx/Rx |
| UL-H | DU: Rx MT: Rx | DU: Rx MT: NULL | DU: Rx MT: Rx |
| UL-S | When DU resource: IA DU: Rx MT: Rx When DU resource: INA DU: NULL MT: Rx | When DU resource: IA DU: Rx MT: NULL When DU resource: INA DU: NULL MT: Tx | When DU resource: IA DU: Rx (only if MT is Rx and the DU knows that ahead of time) MT: Rx When DU resource: INA DU: NULL MT: Tx/Rx |
| F-H | DU: Tx/Rx MT: Rx (only if DU is Rx and the parent DU is aware in advance) | DU: Tx/Rx MT: Tx (only if DU is Tx and the parent DU is aware in advance) | DU: Tx/Rx MT: Tx (only if DU is Tx and the parent DU knows that ahead of time), Rx (only if DU is Rx and the parent DU is aware in advance) |
| F-S | When DU resource: IA DU: Tx/Rx MT: Rx (only if DU is Rx and the parent DU is aware in advance) When DU resource: INA DU: NULL MT: Rx | When DU resource: IA DU: Tx/Rx MT: Tx (only if DU is Tx and the parent DU is aware in advance) When DU resource: INA DU: NULL MT: Tx | When DU resource: IA DU: Tx/Rx MT: Tx (only if DU is Tx and the parent DU knows that ahead of time), Rx (only if DU is Rx and the parent DU is aware in advance) When DU resource: INA |

TABLE 2-continued

DU and MT behavior in case of SDM operation

| | DL | UL | F |
|---|---|---|---|
| | | | DU: NULL MT: Tx/Rx |
| NA | DU: NULL MT: Rx | DU: NULL MT: Tx | DU: NULL MT: Tx/Rx |

For over-the-air (OTA) synchronization of an IAB network, it has been agreed in 3GPP TR 38.874 V16.0.0 that the downlink transmission timing is aligned across IAB-nodes and IAB donors.

SUMMARY

Certain embodiments provide approaches to inform the parent node about the misalignment in time between the IAB MT and DU resources. Using the obtained timing information provided by this invention, the parent node will have a better understanding of the available resource at the IAB MT and can avoid providing DL transmission or UL grants to resources during which time period the IAB node is not able to receive/transmit from/to the parent node. Furthermore, this invention enables better resource coordination between the MT and DU functionalities within an IAB node by largely reducing the possible resource conflicts between the MT and DU.

In a first aspect a method is performed by an integrated access and backhaul, IAB, node. The method comprises determining one or more timing offsets for a time resource, the offsets being in relation to a mobile termination, MT, and a distributed unit, DU, resource of the IAB node. The method further comprises providing to a parent IAB node, information related to the one or more timing offset of the IAB node.

In some examples of the first aspect the one or more timing offset is in relation to a frame or slot timing of the MT and DU resources. The one or more timing offsets may comprise at least one of the following: an offset between a DU downlink transmission and an MT downlink reception; an offset between a DU downlink transmission and an MT uplink transmission; an offset between a DU uplink reception and an MT downlink reception; and an offset between a DU uplink reception and an MT uplink transmission. In some examples the information related to the one or more timing offsets corresponds to a timing difference between one of the DU resources or one of the MT resources and any one of the other DU or MT resources. In some examples each of the one or more timing offsets corresponds to a timing difference, $\Delta T$, between one of the DU resources or one of the MT resources and a reference time. The one or more timing offsets may have orthogonal frequency-division multiplexing, OFDM, symbol granularity. In some examples of the first aspect the method further comprises obtaining a set of timing quantities which are indicative of one or more timing offsets between an MT resource and a DU resource of the IAB node. In some examples the set of timing quantities comprise a timing difference between one of the DU resource timing or one of the MT resource timing and any one of the other DU or MT resource timing.

In a second aspect, a method is performed by a parent integrated access and backhaul, IAB, node, wherein a parent IAB node is a first IAB node serving a second IAB node for scheduling downlink and uplink transmissions between the parent IAB node and the second or served IAB node. The method comprises obtaining information related to one or more timing offsets between mobile termination, MT, resources and distributed unit, DU, resources of the second or served IAB node and scheduling uplink and/or downlink transmissions at the second or served IAB node based on the received information.

In some examples of the second aspect, the one or more timing offset is in relation to a frame or slot timing of the MT and DU resources. The one or more timing offset may comprise any one of the following: offset between DU downlink transmission and MT downlink reception; offset between DU downlink transmission and MT uplink transmission; offset between DU uplink reception and MT downlink reception; and offset between DU uplink reception and MT uplink transmission. In some examples the information related to the one or more timing offsets corresponds to a timing difference between one of the DU resources or one of the MT resources and any one of the other DU or MT resources. In some examples of the second aspect, the method further comprises the parent IAB node determining the one or more timing offsets between the MT resource timings and the DU resource timings of the second or served IAB node based, at least partly, on the obtained information related to the one or more timing offsets. The one or more timing offset may correspond to a timing difference, $\Delta T$, between one of the DU frame or slot timings or one of the MT frame or slot timings and a reference time. In some examples the one or more timing offset has orthogonal frequency-division multiplexing, OFDM, symbol granularity. In some examples the parent IAB node adds one symbol to each determined timing offset. The information may be obtained by the parent IAB node via signalling from the second or served IAB node.

In a third aspect, an integrated access and backhaul, IAB, node is provided. The IAB node comprising a mobile termination, MT and a radio interface distributed unit, DU wherein the MT terminates the radio interface layers of a backhaul interface towards a parent node and the DU interfaces user equipment, UE, and/or MTs of another IAB node, the IAB node is configured to determine one or more timing offset for a time resource, the offset being in relation to an MT and a DU resource of the IAB node and provide to the parent IAB node (300), information related to the one or more timing offsets of the IAB node.

In some examples of the third aspect, the one or more timing offset is in relation to a frame or slot timing of the MT and DU resources. In some examples the one or more timing offsets comprises at least one of the following: an offset between DU downlink transmission and MT downlink reception; an offset between DU downlink transmission and MT uplink transmission; an offset between DU uplink reception and MT downlink reception; and an offset between DU uplink reception and MT uplink transmission. In some examples the information related to the one or more timing offsets corresponds to a timing difference between one of the DU resources or one of the MT resources and any one of the other DU or MT resources. Each of the one or more timing offset may correspond to a timing difference, $\Delta T$, between one of the DU resources or one of the MT resources and a reference time. The one or more timing offset may have orthogonal frequency-division multiplexing, OFDM, symbol granularity. In some examples of this aspect, the IAB node is further configured to obtain a set of timing quantities which are indicative of one or more timing offsets between an MT resource and a DU resource of the IAB node. The set of timing quantities may comprise a timing difference between one of the DU resource timing or one of the MT resource timing and any one of the other DU or MT resource timing.

In a fourth aspect, a parent integrated access and backhaul IAB, wherein a parent IAB node is a first IAB node serving a second IAB node, the parent IAB node is configured to obtain information related to one or more timing offset between mobile termination, MT, resources and distributed unit, DU, resources of the second or served IAB node and schedule uplink or downlink transmissions at the second or served IAB node based on the one or more timing offset.

In some examples of the fourth aspect, the one or more timing offset is in relation to a frame or slot timing of the MT and DU resources. The one or more timing offset may comprise any one of the following: offset between DU downlink transmission and MT downlink reception; offset between DU downlink transmission and MT uplink transmission; offset between DU uplink reception and MT downlink reception; and offset between DU uplink reception and MT uplink transmission. In some examples the information related to the one or more timing offset corresponds to a timing difference between one of the DU resources or one of the MT resources and any one of the other DU or MT resources. In some examples of this aspect the IAB parent node is further configured to determine the one or more timing offset between the MT resource timings and the DU resource timings of the second or served IAB node based, at least partly, on the obtained information related to the one or more timing offsets. The one or more timing offset may correspond to a timing difference, $\Delta T$, between one of the DU frame or slot timings or one of the MT frame or slot timings and a reference time. The one or more timing offset may have orthogonal frequency-division multiplexing, OFDM, symbol granularity. In some examples the IAB parent node is further configured to add one symbol to each determined timing offset. In some examples the information is obtained by the parent node via signalling from the second or served IAB node.

In a further aspect a computer program is provided, the computer program comprising instructions which when executed on a computer or processing circuitry cause the computer or processing circuitry to execute any one of the methods described above. In some examples the computer program is comprised in a computer storage medium or carrier.

DETAILED DESCRIPTION

Figure 1:
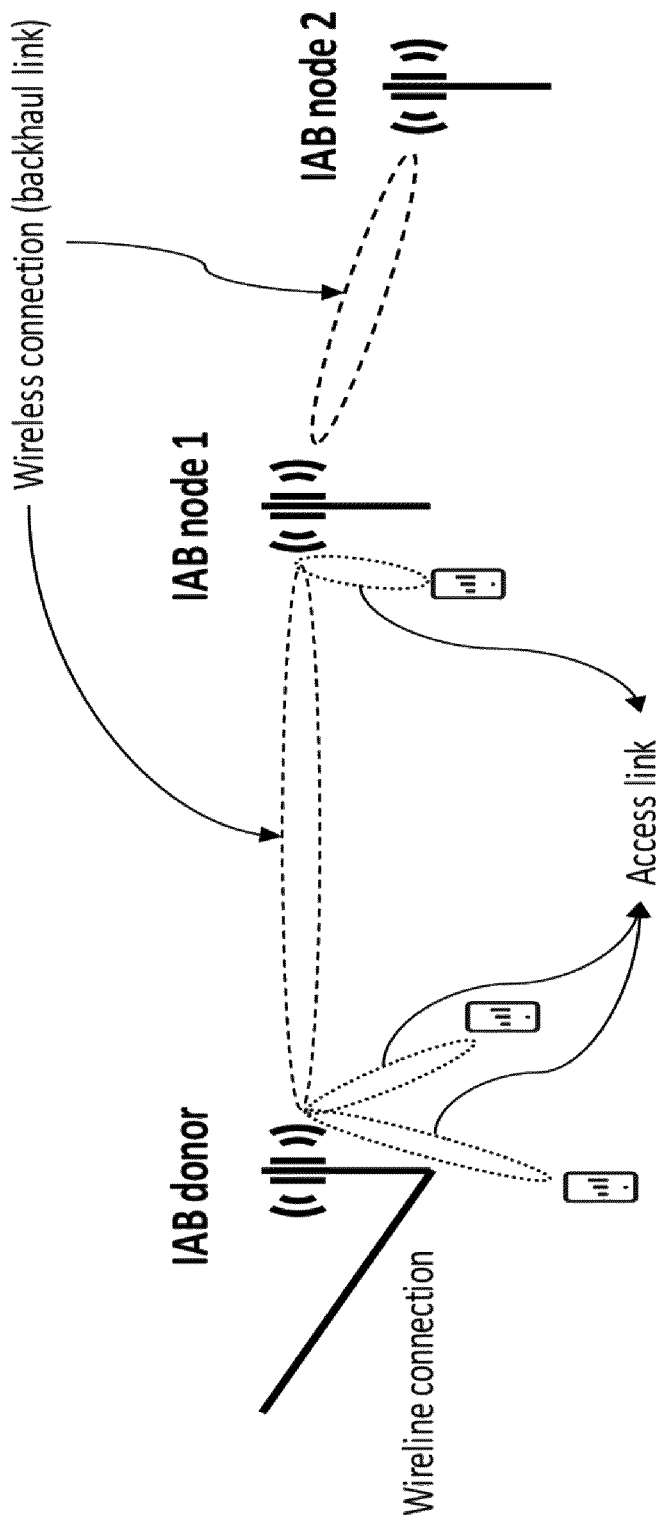
FIG. 1 depicts Multi-hop deployment in an integrated access and backhaul (IAB) network.
Figure 2:
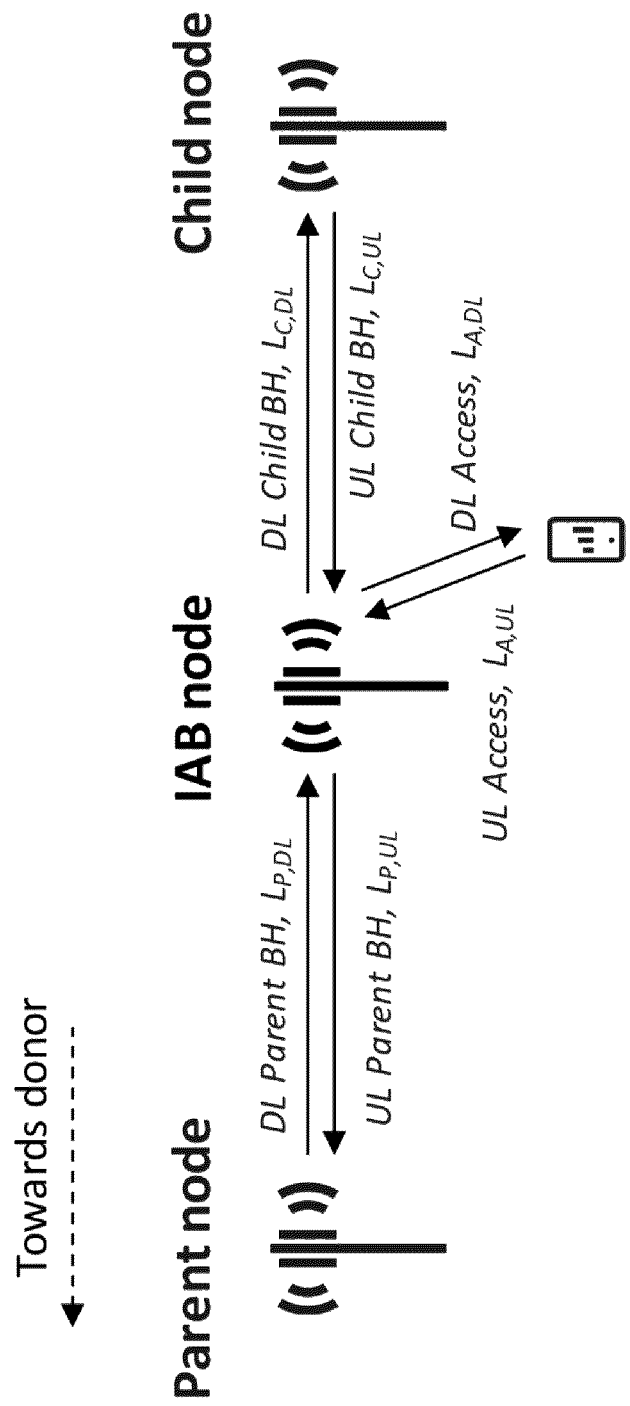
FIG. 2 shows IAB hierarchy.
Figure 3:
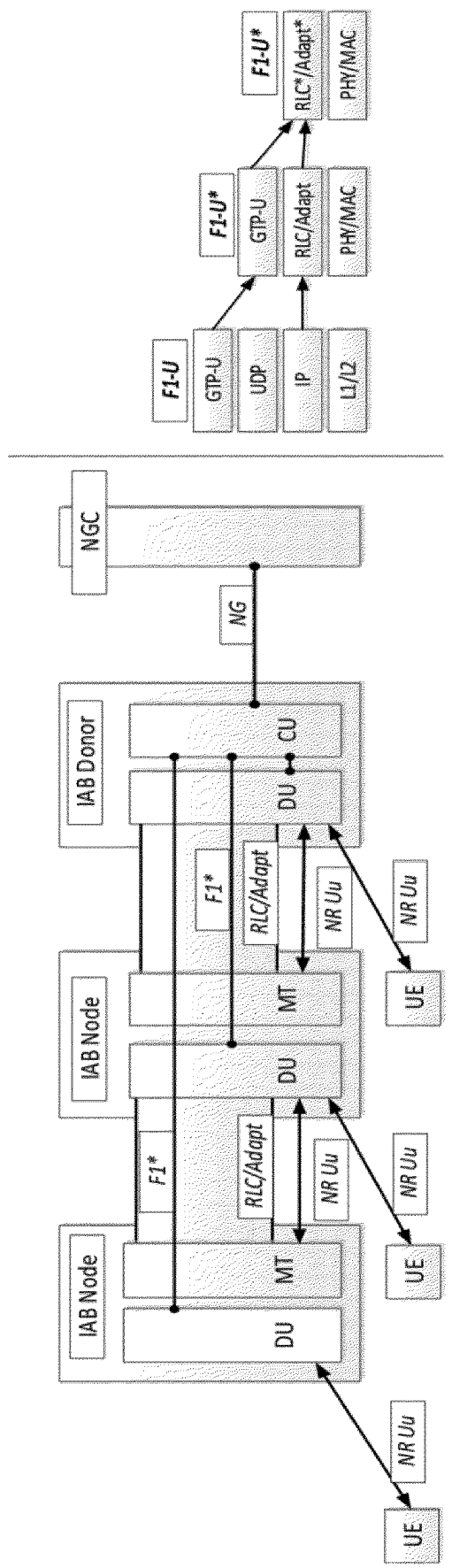
FIG. 3 shows a reference architecture according to embodiments of the present disclosure.
Figure 4:
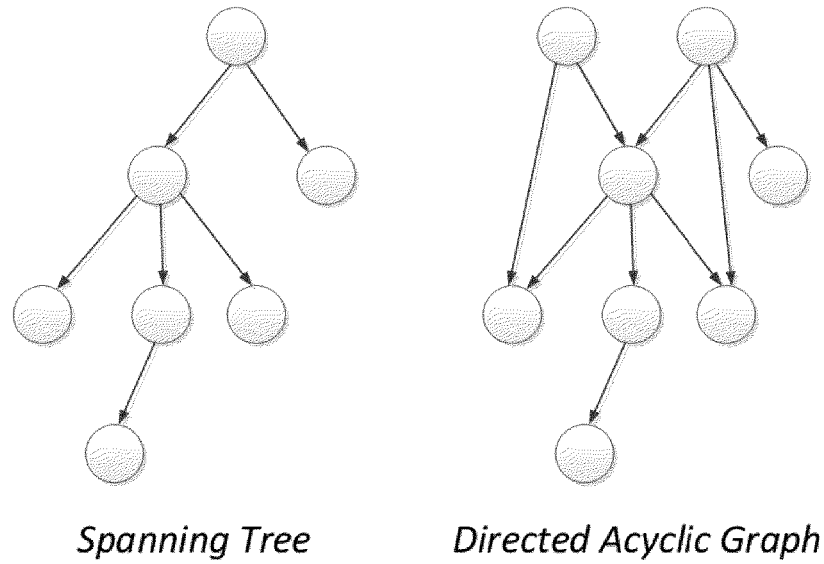
FIG. 4 shows example connectivity schemes according embodiments of the present disclosure.
Figure 5:
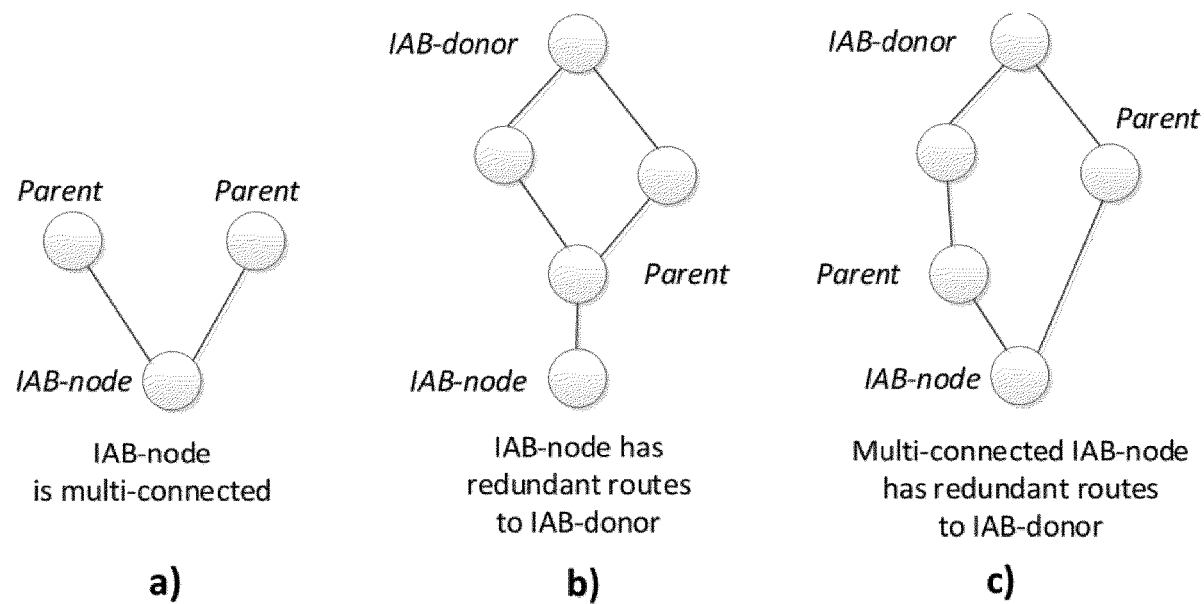
FIG. 5 shows further example connectivity schemes according embodiments of the present disclosure.
Figure 6:
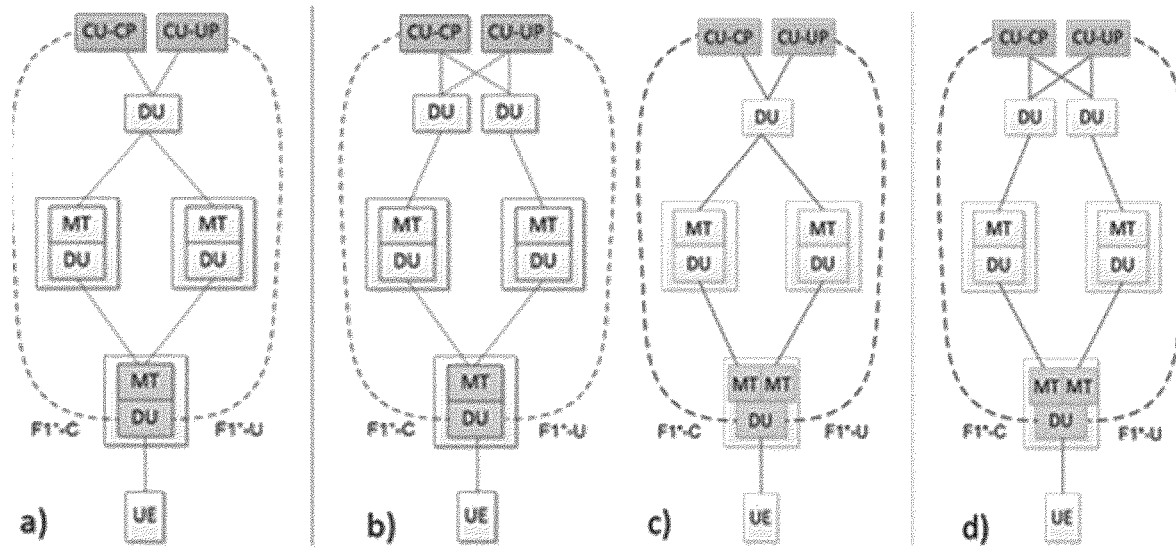
FIG. 6 shows example redundancy schemes according embodiments of the present disclosure.

The resource coordination between IAB MT and DU as listed in Table 1 and Table 2 assumes that the MT and DU resources are aligned, for example, the k-th slot of MT is aligned in time with the k-th slot of DU.

In this case, configuring the k-th slot of IAB DU as Hard resource means the k-th slot is potentially not available for the MT part of the same IAB node. This is especially true for mixed transmit and receive configurations of MT and DU, if the node is only capable of half-duplex for IAB, which implies that the IAB-node cannot transmit and receive simultaneously on both access- and backhaul links.

However, in practice, the MT and DU resources are not exactly aligned due to propagation delay, indicated timing advance for UL transmission, required DL transmission timing alignment, processing time within an IAB node, etc. This needs to be taken into account when considering DU H/S configuration impact on MT availability.

As a result, configuring the k-th slot of IAB DU as Hard resource may not only impact the availability of the k-th slot for the MT part of the same IAB node, but also impact the availability of the (k−1)-th slot and/or the (k+1)-th slot of the MT resource. Without knowing such timing information, the parent node may schedule transmission to/from the IAB MT that cannot be properly received/transmitted due to the unavailable resource at the MT side. The parent node is also not able to properly indicate availability of Soft-configured DU resources through explicit signaling.

To handle potential misalignment in time of the configured DU and MT resources when determining the validity of H/S/NA at the DU, H/S/NA may be applied relative to the DU resource configuration (D/U/F) slot timing without considering the MT resource configuration or timing. A definition of additional restrictions on the usage of the semi-static configuration (e.g. guard symbols) based on deployment scenario or DL/UL switching times within an IAB node, etc. is considered. It is also considered whether a CU needs to get information about the required guard symbols for a given DU configuration and if so how this would be obtained.

In one or more of the embodiments disclosed herein means to inform the parent node about the misalignment in time between the IAB MT and DU resources are provided. In some examples the information provided includes the following four combinations:

misalignment between DU DL Tx and MT DL Rx;
misalignment between DU DL Tx and MT UL Tx;
misalignment between DU UL Rx and MT DL Rx;
misalignment between DU UL Rx and MT UL Tx.

Such information would assist the parent node scheduling and mitigate possible resource conflicts at the IAB node by knowing exactly what the unavailable MT resource is, when the IAB DU is configured as DL-Hard, UL-Hard and Flexible-Hard, respectively. The information will also be useful when the parent node releases MT resources to certain soft DU resource via explicit indication. The CU does not need to know such information when configuring the DU resources. In some examples it is proposed that the parent node is provided with the information about the timing misalignment between any one of the DU UL/DL resource and any one of the MT UL/DL resources of all its served IAB nodes. It is also observed that the CU does not need the information about the required guard symbols/timing misalignment for a given DU configuration.

A number of different approaches to provide timing-related information of the IAB node to the parent node are introduced, with which the parent node can obtain above information.

Using the obtained timing information provided by one or more embodiments of this disclosure, the parent node will have a better understanding of the available resource timing at the IAB MT and can avoid providing DL transmission or UL grants to resources during which time period the IAB node is not able to receive/transmit from/to the parent node.

Furthermore, in some examples better resource coordination between the MT and DU functionalities within an IAB node is enabled, by reducing the possible resource conflicts between the MT and DU.

A parent node may obtain the IAB DU configuration by various means such as signaling over a protocol interface, e.g. RRC. The signaling mechanism for providing resource re(configuration) information of IAB nodes to the DU part of their parent IAB nodes should enable efficient utilization of spectrum resources in an IAB network. For example, the CU may send independent F1-AP messages that contain the resource configurations for each concerned IAB node. The F1 resource indication message may be an enhancement of an existing F1 interface management message, such as e.g. a gNB-DU Configuration Update or a gNB-DU Resource Coordination, or a new message, such as e.g. an IAB Resource Update. In order to distinguish the case whether the message is concerning the receiver IAB node or a child node, an optional information element (IE), which may e.g. be referred to as child, may be included, the absence of which may indicate that the resource information is concerning the IAB node that receives the message, while the presence of this IE may indicate that the resource pattern is concerning a child of the IAB node that is indicated by the IE. The donor node CU may send an F1 UE context management message, such as e.g. a UE CONTEXT MODIFICATION REQUEST, to a parent IAB node that comprises an embedded RRC message. The resource pattern configuration may be comprised in the RRC message and it may optionally be included directly in the F1-AP message as well. The parent node may store the resource pattern of the child node internally, such as e.g. in a mapping table of children identities and their resource configurations, and may forward the RRC message to the destination child node. Another possibility may be to not include the resource configuration directly inside the F1-AP message in a separate IE, but let the parent node read it by looking into the embedded RRC message. This approach, though signaling wise efficient, requires the IAB node to be able to understand future versions of RRC (e.g. it may not allow a setup where a node is running the 3GPP rel-16 of the F1 specifications while the MT is running a 3GPP rel-17 RRC). In case the destination IAB node has multiple parents, in the first F1-AP message to the first parent, the RRC message will be included in the F1-AP message, while it could be left out in subsequent F1-AP messages to other parents. In order to ensure that the RRC message will not be interpreted as an RRC message to the MT part of the destination IAB node, the parent IAB node may encapsulate the RRC message within an adaptation header that includes header information that is the same as for F1-AP messages destined to the DU part of the child IAB node and maps to the backhaul RLC channel between the parent and child node that is associated with the F1-AP messages. When the MT part of the IAB node receives this packet, it will assume that it is an F1-AP to the DU part of the IAB node and may forward the message through an internal interface accordingly. In one variant of this approach, the DU of the destination IAB node, may upon receiving the RRC message read the contents, identify the resource pattern and apply it.

In another variant of this approach, the RRC message may indeed be received by the MT. No adaptation header may be added, and the message may be sent directly to the MT via access RLC channels that are associated with signaling radio bearers. The MT may then identify that the message is a resource configuration message for the DU part, e.g. based on a message identifier and/or header comprised in the RRC message, extract the resource configuration fields from the message, and forward the resource configuration to the DU part through an internal interface. According to a further variant of this approach, instead of an RRC message, the encapsulated message may not be an RRC message but an F1-AP message to the child node. The parent IAB node will forward whatever is in the transparent container that is supposed to contain an RRC message from the MT to the DU through an internal interface. Accordingly, the parent node knows the resource type configured to the IAB DU during a certain time period.

Figure 7:
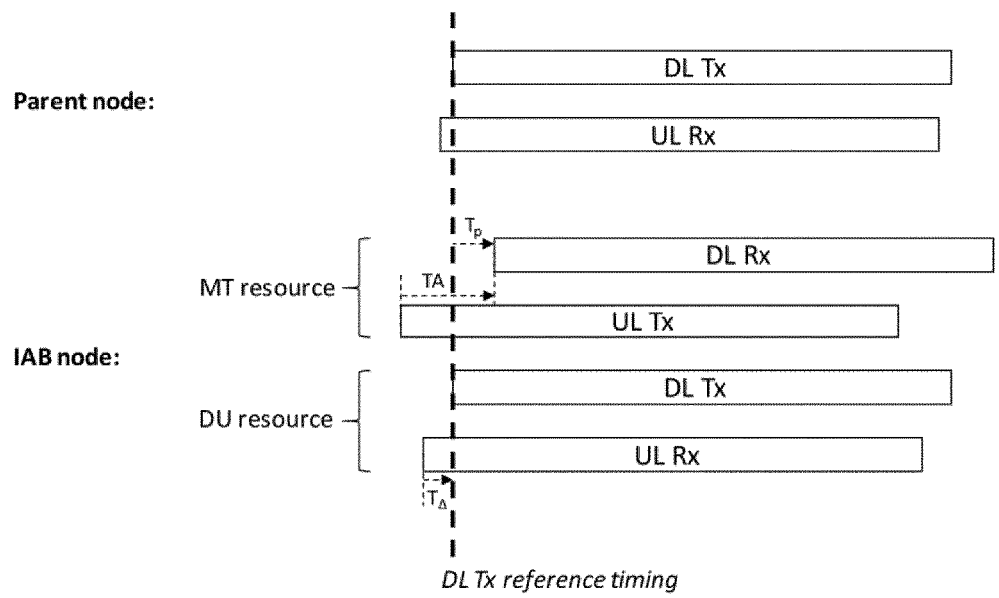
FIG. 7 shows an example of timing misalignment according to one or more embodiments of the present disclosure.

Due to the timing misalignment between IAB MT and DU as illustrated in FIG. 7, such information is not sufficient for the parent node to do proper scheduling towards an IAB MT without possible resource wastage. FIG. 7: depicts timing misalignment between IAB MT and DU resources at the k-th slot; the parameters are positive in the arrow-pointing direction. "Tx" denotes transmission and "Rx" denotes reception. Three timing properties present at the IAB node:

$T_p$: the difference between the DL transmitting timing at the parent node (DU) and the DL receiving timing at the IAB node (MT). $T_p$ equals the parent-node-to-IAB-node propagation time.

TA: timing advance, i.e., difference between the UL transmitting timing and the DL receiving timing at the IAB node (MT).

$T_A$: deviation of the UL receiving timing from the DL transmitting timing at the IAB node (DU).

Timing misalignment between IAB MT and DU resources caused by, but not limited to, the above three parameters and their determination and estimation makes it difficult to actually implement the desired coordination between IAB MT and DU as listed in Table 1 and Table 2.

Figure 8:
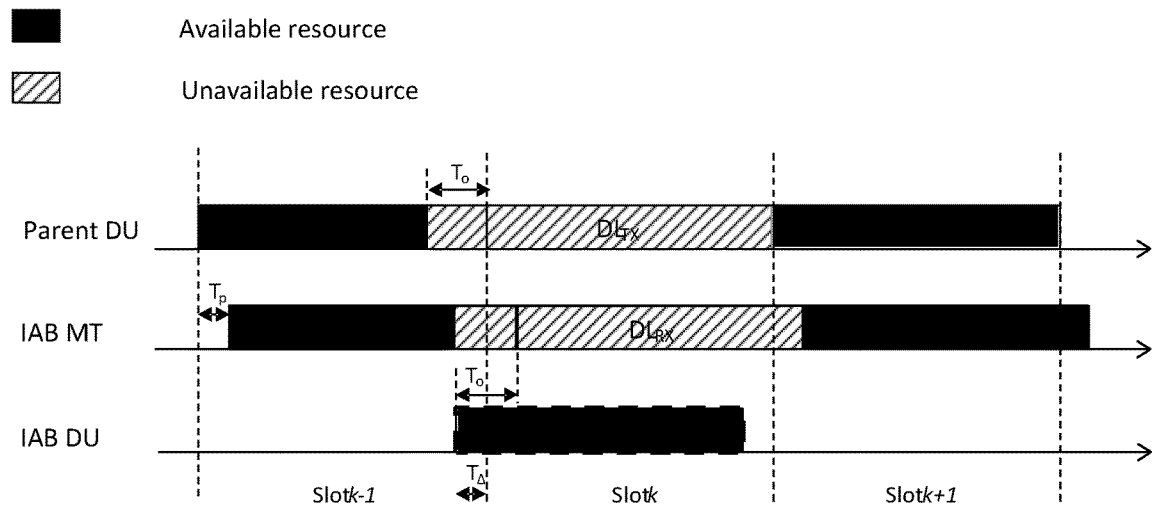
FIG. 8 shows an example of timing misalignment according to one or more embodiments of the present disclosure.

FIG. 8 depicts an example case of resource availability conflict due to propagation delay and receive timing advance. In this example, the k-th slot of IAB DU resource is configured for UL RX while the k-th slot of IAB MT resource is configured for DL Rx, which are offset depending on the propagation delay and the DL Tx timing setting of the IAB-node. If the k-th slot of IAB DU resource is a Hard resource, the parent node should not schedule any transmission during the k-th slot to the MT. Since the k-th slot of IAB MT resource in DL is delayed by the propagation delay, the (k−1)-th slot of IAB MT resource may also be delayed by the propagation delay, which seems to be available for the parent node to schedule some transmission. If the parent node schedules DL Tx to the IAB MT during the (k−1)-th slot, the last part of the transmission may not be received by the IAB node since it is overlapped with the k-th slot of IAB DU resource, which is a Hard resource and unavailable for the MT.

To avoid such resource conflict at the IAB node, it is beneficial for the parent node to know some information about the timing misalignment between the IAB-node MT and DU resources in order to better arrange the transmission from/to the IAB MT with the consideration of the IAB DU configurations.

For simplicity, without loss of generality, the following description is based on a pair of one parent node and one IAB node. If an IAB node is wirelessly connected to more than one parent node, the same approach is used to provide timing information of the IAB node to each of the parent node. If a parent node is wirelessly connected to more than one downstream IAB node, the parent node receives the timing information of the respective IAB node from each of the IAB node.

As shown in FIG. 7, there are four resource type allocations of the IAB node. For the convenience of denotation, we refer to the four possible resource type allocations of the IAB node as: D(T) for DU DL Tx, D(R) for DU UL Rx, M(T) for MT UL Tx, and M(R) for MT DL Rx. The resource type allocations may also be referred to as "resource types".

Timing misalignment exists between the frame timing or slot timing of DU resources between the MT resources, and also between the resources of MT and DU. The resources are typically allocated from a time and frequency resource grid (e.g. resource blocks), however for the purposes of this disclosure only the time domain of the resources is of interest, and thus for brevity the term "time-resources" shall refer to resources in the time domain which may comprise time and frequency resources. For the parent node, the useful information is the misalignment in time or offset timing between the IAB MT and DU resources, which includes the following four combinations:

misalignment between DU DL Tx and MT DL Rx, denoted as $T_{D(T)-M(R)}$;
misalignment between DU DL Tx and MT UL Tx, denoted as $T_{D(T)-M(T)}$;
misalignment between DU UL Rx and MT DL Rx, denoted as $T_{D(R)-M(R)}$;

misalignment between DU UL Rx and MT UL Tx, denoted as $T_{D(R)-M(T)}$.

Various embodiments will now be described for determining the misalignments and providing the misalignment information.

In one embodiment, information about the three timing differences is provided to the parent node. The information of each timing difference is obtained from the timing misalignment or offset between the time resources of two of the four possible resource types of the IAB node. The information could be the timing differences themselves. The information about the three timing differences should relate to each of the four possible resource types of the IAB node at least once. Further, it can be defined if the frame/slot timing of a first resource type, e.g. X, is after the frame/slot timing of a second resource type e.g. Y, the timing difference between the time resources of a first and a second resource type, $T_{X-Y}$, is positive; if the timing of a first time resource is before the timing of a second time resource, the timing difference between the first and the second resource types is negative. Upon obtaining information about the three timing differences, the parent node calculates the four timing-misalignments or offsets between the IAB MT and DU resources if not directly provided.

Figure 9:
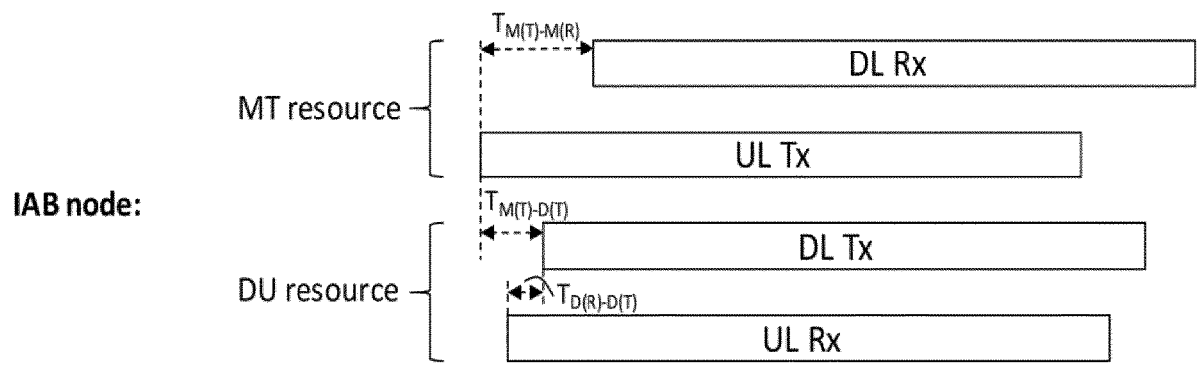
FIG. 9 shows an example of timing offset information according to one or more embodiments of the present disclosure.

One example of the valid three values to provide is shown in FIG. 9 where three timing difference information $T_{M(T)-M(R)}$, $T_{M(T)-D(T)}$, and $T_{D(R)-D(T)}$ of the IAB node is provided to the parent node. The three timing differences contain the differences between the time resources for all the four M(R), M(T), D(T) and D(R) resource types. The parent node can calculate the four values by the following:

$$T_{D(T)-M(R)} = T_{M(T)-M(R)} - T_{M(T)-D(T)};$$

$$T_{D(T)-M(T)} = -T_{M(T)-D(T)};$$

$$T_{D(R)-M(R)} = T_{M(T)-M(R)} - T_{M(T)-D(T)} + T_{D(R)-D(T)};$$

$$T_{D(R)-M(T)} = T_{D(R)-D(T)} - T_{M(T)-D(T)};$$

One example of the invalid three values providing insufficient information can be $T_{M(T)-M(R)}$, $T_{M(T)-D(T)}$, and $T_{D(T)-M(R)}$ of the IAB node, since there it is lacking information related to the timing for the resource type D(R). List of the combinations of invalid three-value provided to the parent node is as follows:

$T_{M(T)-M(R)}$, $T_{M(T)-D(T)}$, and $T_{D(T)-M(R)}$, i.e., no D(R) contained;

$T_{M(T)-M(R)}$, $T_{M(T)-D(R)}$, and $T_{D(R)-M(R)}$, i.e., no D(T) contained;

$T_{M(T)-D(T)}$, $T_{D(R)-D(T)}$, and $T_{M(T)-D(R)}$, i.e., no M(R) contained;

$T_{M(R)-D(T)}$, $T_{D(R)-D(T)}$, and $T_{M(R)-D(R)}$, i.e., no M(T) contained;

Table 3 shows a list of the possible combinations of the valid values which could be provided to the parent node.

TABLE 3

List of values provided to the parent node.

| | Values provided to the parent node | Parent node calculates the four required values |
|---|---|---|
| (1) | $T_{M(T)-M(R)}$ $T_{D(T)-M(R)}$ $T_{D(R)-M(R)}$ | $T_{D(T)-M(R)} = T_{D(T)-M(R)}$ $T_{D(T)-M(T)} = T_{D(T)-M(R)} - T_{M(T)-M(R)}$ $T_{D(R)-M(R)} = T_{D(R)-M(R)}$ $T_{D(R)-M(T)} = T_{D(R)-M(R)} - T_{M(T)-M(R)}$ |
| (2) | $T_{M(T)-M(R)}$ $T_{D(T)-M(R)}$ | $T_{D(T)-M(R)} = T_{D(T)-M(R)}$ $T_{D(T)-M(T)} = T_{D(T)-M(R)} - T_{M(T)-M(R)}$ |

TABLE 3-continued

List of values provided to the parent node.

| | Values provided to the parent node | Parent node calculates the four required values |
|---|---|---|
| | $T_{D(R)-M(T)}$ | $T_{D(R)-M(R)} = T_{D(R)-M(T)} + T_{M(T)-M(R)}$ $T_{D(R)-M(T)} = T_{D(R)-M(T)}$ |
| (3) | $T_{M(T)-M(R)}$ $T_{D(T)-M(R)}$ $T_{D(R)-D(T)}$ | $T_{D(T)-M(R)} = T_{D(T)-M(R)}$ $T_{D(T)-M(T)} = T_{D(T)-M(R)} - T_{M(T)-M(R)}$ $T_{D(R)-M(R)} = T_{D(R)-D(T)} + T_{D(T)-M(R)}$ $T_{D(R)-M(T)} = T_{D(R)-D(T)} + T_{D(T)-M(R)} - T_{M(T)-M(R)}$ |
| (4) | $T_{M(T)-M(R)}$ $T_{D(R)-M(R)}$ $T_{D(T)-M(T)}$ | $T_{D(T)-M(R)} = T_{D(T)-M(T)} + T_{M(T)-M(R)}$ $T_{D(T)-M(T)} = T_{D(T)-M(T)}$ $T_{D(R)-M(R)} = T_{D(R)-M(R)}$ $T_{D(R)-M(T)} = T_{D(R)-M(R)} - T_{M(T)-M(R)}$ |
| (5) | $T_{M(T)-M(R)}$ $T_{D(R)-M(R)}$ $T_{D(R)-D(T)}$ | $T_{D(T)-M(R)} = -T_{D(R)-D(T)} + T_{D(R)-M(R)}$ $T_{D(T)-M(T)} = -T_{D(R)-D(T)} + T_{D(R)-M(R)} - T_{M(T)-M(R)}$ $T_{D(R)-M(R)} = T_{D(R)-M(R)}$ $T_{D(R)-M(T)} = T_{D(R)-M(R)} - T_{M(T)-M(R)}$ |
| (6) | $T_{M(T)-M(R)}$ $T_{D(T)-M(T)}$ $T_{D(R)-M(T)}$ | $T_{D(T)-M(R)} = T_{D(T)-M(T)} + T_{M(T)-M(R)}$ $T_{D(T)-M(T)} = T_{D(T)-M(T)}$ $T_{D(R)-M(R)} = T_{D(R)-M(T)} + T_{M(T)-M(R)}$ $T_{D(R)-M(T)} = T_{D(R)-M(T)}$ |
| (7) | $T_{M(T)-M(R)}$ $T_{D(T)-M(T)}$ $T_{D(R)-D(T)}$ | $T_{D(T)-M(R)} = T_{D(T)-M(T)} + T_{M(T)-M(R)}$ $T_{D(T)-M(T)} = T_{D(T)-M(T)}$ $T_{D(R)-M(R)} = T_{D(R)-D(T)} + T_{D(T)-M(T)} + T_{M(T)-M(R)}$ $T_{D(R)-M(T)} = T_{D(R)-D(T)} + T_{D(T)-M(T)}$ |
| (8) | $T_{M(T)-M(R)}$ $T_{D(R)-M(T)}$ $T_{D(R)-D(T)}$ | $T_{D(T)-M(R)} = -T_{D(R)-D(T)} + T_{D(R)-M(T)} + T_{M(T)-M(R)}$ $T_{D(T)-M(T)} = -T_{D(R)-D(T)} + T_{D(R)-M(T)}$ $T_{D(R)-M(R)} = T_{D(R)-M(T)} + T_{M(T)-M(R)}$ $T_{D(R)-M(T)} = T_{D(R)-M(T)}$ |
| (9) | $T_{D(T)-M(R)}$ $T_{D(R)-M(R)}$ $T_{D(T)-M(T)}$ | $T_{D(T)-M(R)} = T_{D(T)-M(R)}$ $T_{D(T)-M(T)} = T_{D(T)-M(T)}$ $T_{D(R)-M(R)} = T_{D(R)-M(R)}$ $T_{D(R)-M(T)} = T_{D(R)-M(R)} - T_{D(T)-M(R)} + T_{D(T)-M(T)}$ |
| (10) | $T_{D(T)-M(R)}$ $T_{D(R)-M(R)}$ $T_{D(R)-M(T)}$ | $T_{D(T)-M(R)} = T_{D(T)-M(R)}$ $T_{D(T)-M(T)} = T_{D(T)-M(R)} - T_{D(R)-M(R)} + T_{D(R)-M(T)}$ $T_{D(R)-M(R)} = T_{D(R)-M(R)}$ $T_{D(R)-M(T)} = T_{D(R)-M(T)}$ |
| (11) | $T_{D(T)-M(R)}$ $T_{D(T)-M(T)}$ $T_{D(R)-M(T)}$ | $T_{D(T)-M(R)} = T_{D(T)-M(R)}$ $T_{D(T)-M(T)} = T_{D(T)-M(T)}$ $T_{D(R)-M(R)} = T_{D(R)-M(T)} - T_{D(T)-M(T)} + T_{D(T)-M(R)}$ $T_{D(R)-M(T)} = T_{D(R)-M(T)}$ |
| (12) | $T_{D(T)-M(R)}$ $T_{D(T)-M(T)}$ $T_{D(R)-D(T)}$ | $T_{D(T)-M(R)} = T_{D(T)-M(R)}$ $T_{D(T)-M(T)} = T_{D(T)-M(T)}$ $T_{D(R)-M(R)} = T_{D(R)-D(T)} + T_{D(T)-M(R)}$ $T_{D(R)-M(T)} = T_{D(R)-D(T)} + T_{D(T)-M(T)}$ |
| (13) | $T_{D(T)-M(R)}$ $T_{D(R)-M(T)}$ $T_{D(R)-D(T)}$ | $T_{D(T)-M(R)} = T_{D(T)-M(R)}$ $T_{D(T)-M(T)} = -T_{D(R)-D(T)} + T_{D(R)-M(T)}$ $T_{D(R)-M(R)} = T_{D(R)-D(T)} + T_{D(T)-M(R)}$ $T_{D(R)-M(T)} = T_{D(R)-M(T)}$ |
| (14) | $T_{D(R)-M(R)}$ $T_{D(T)-M(T)}$ $T_{D(R)-M(T)}$ | $T_{D(T)-M(R)} = T_{D(T)-M(T)} - T_{D(R)-M(T)} + T_{D(R)-M(R)}$ $T_{D(T)-M(T)} = T_{D(T)-M(T)}$ $T_{D(R)-M(R)} = T_{D(R)-M(R)}$ $T_{D(R)-M(T)} = T_{D(R)-M(T)}$ |
| (15) | $T_{D(R)-M(R)}$ $T_{D(T)-M(T)}$ $T_{D(R)-D(T)}$ | $T_{D(T)-M(R)} = -T_{D(R)-D(T)} + T_{D(R)-M(R)}$ $T_{D(T)-M(T)} = T_{D(T)-M(T)}$ $T_{D(R)-M(R)} = T_{D(R)-M(R)}$ $T_{D(R)-M(T)} = T_{D(R)-D(T)} + T_{D(T)-M(T)}$ |
| (16) | $T_{D(R)-M(R)}$ $T_{D(R)-M(T)}$ $T_{D(R)-D(T)}$ | $T_{D(T)-M(R)} = -T_{D(R)-D(T)} + T_{D(R)-M(R)}$ $T_{D(T)-M(T)} = -T_{D(R)-D(T)} + T_{D(R)-M(T)}$ $T_{D(R)-M(R)} = T_{D(R)-M(R)}$ $T_{D(R)-M(T)} = T_{D(R)-M(T)}$ |

In another embodiment, information about four timing quantities are provided to the parent node. The four timing quantities are determined as the timing difference between a reference time defined within the IAB node and the timing of the four transmissions for M(R), M(T), D(T), and D(R), denoted as $\Delta T_{M(R)}$, $\Delta T_{M(T)}$, $\Delta T_{D(T)}$ and $\Delta T_{D(R)}$, respectively. The reference time may be common to the concerned time-resource type allocations. The information could be the four timing quantities themselves. Further, it can be defined if the frame/slot timing for a resource type is after the reference, the timing quantity is positive; if the frame/slot timing for a resource type is before the reference time, the timing quantity is negative. Upon obtaining information of the four timing quantities, the parent node calculates the four timing misalignments or offsets between the IAB MT and DU resource timing as required for the parent node to perform accurate scheduling, as described above.

Figure 10:
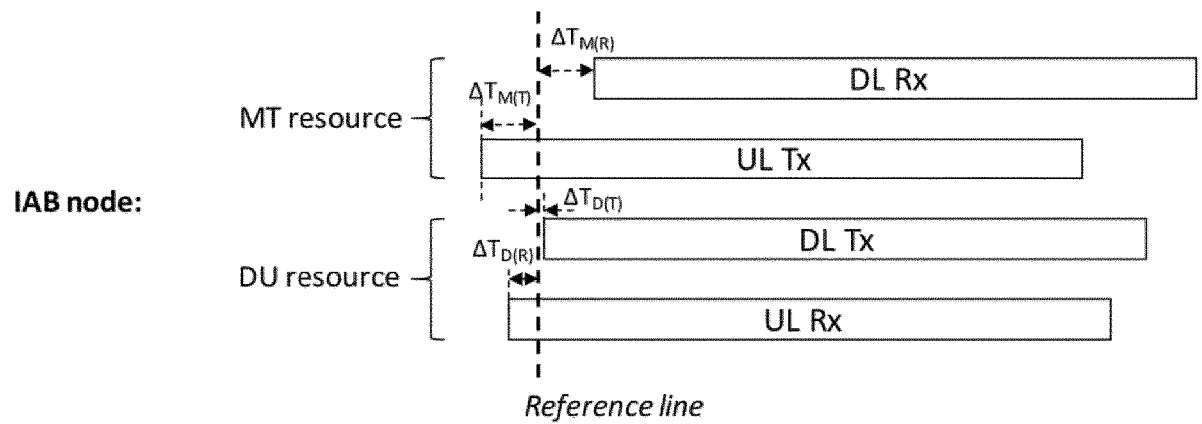
FIG. 10 shows an example of timing offset information according to one or more embodiments of the present disclosure.

An example is shown in FIG. 10, where information about the four timing quantities of the IAB node provided to the parent node consist of deltas from a reference time.

Specifically, $\Delta T_{M(R)}$, $\Delta T_{M(T)}$, $\Delta T_{D(T)}$ and $\Delta T_{D(R)}$ of the IAB node are provided to the parent node. In this example, $\Delta T_{M(R)}$ and $\Delta T_{D(T)}$ are positive whereas $\Delta T_{M(T)}$ and $\Delta T_{D(R)}$ are negative. The parent node can calculate the four required timing values as:

$$T_{D(T)-M(R)} = \Delta T_{D(T)} - \Delta T_{M(R)};$$

$$T_{D(T)-M(T)} = \Delta T_{D(T)} - \Delta T_{M(T)};$$

$$T_{D(R)-M(R)} = \Delta T_{D(R)} - \Delta T_{M(R)};$$

$$T_{D(R)-M(T)} = \Delta T_{D(R)} - \Delta T_{M(T)};$$

Although the IAB node needs to provide one more timing quantity to the parent node comparing to the previous embodiment, the advantage of sending the delta is that the IAB node can define a proper reference time to e.g., reduce the dynamic range of the four timing quantities. For example, the reference time can be set in the middle of the largest timing difference between time resources of two resource types of the IAB node. The parent node can calculate the four timing misalignment/offsets between the IAB MT and DU resources using the information about the provided four timing quantities with the same formulas irrespective of where the reference line is within the IAB node and whether the reference line is changed from time to time.

In another example, information of the four timing-misalignment/offsets of $T_{D(T)-M(R)}$, $T_{D(T)-M(T)}$, $T_{D(R)-M(R)}$, and $T_{D(R)-M(T)}$ between the IAB MT and DU resources could be provided directly to the parent node.

Figure 11:
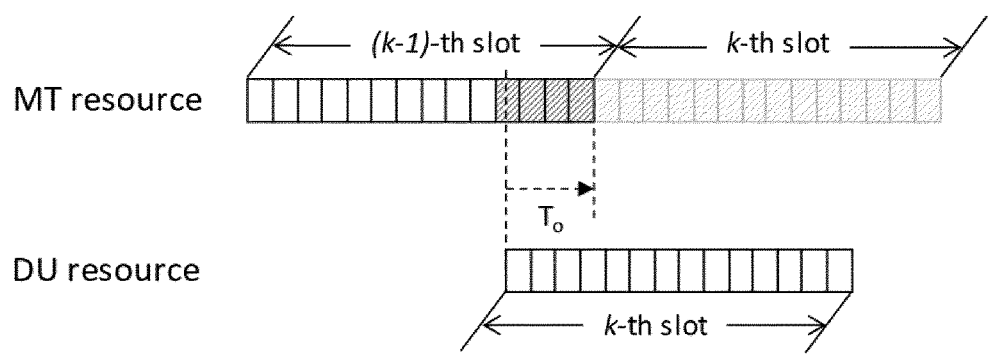
FIG. 11 shows an example of resource availability according to one or more embodiments of the present disclosure.

From the parent node perspective, the information of the timing misalignment between IAB MT and DU can be represented in the unit of symbol. Because the transmission data is carried in time units related to orthogonal frequency division multiplexing (OFDM) symbols, part of such a symbol being unavailable means the whole symbol is unavailable. An example is depicted in FIG. 11. The k-th slot of IAB DU resource is configured as UL-Hard, whereas both the (k−1)-th and k-th slots of IAB MT resource are configured as DL. From the definition of Hard resource, the k-th slot of IAB MT resource will be unavailable. In addition, due to the misalignment in time between the IAB MT and DU at the k-th slot, the last part of the (k−1)-th slot of IAB MT resource will also be unavailable.

Although the misalignment duration $T_O$ is assumed to only span three and half symbols of the (k−1)-th slot, for the IAB MT, all the last four symbols of the (k−1)-th slot cannot be used, as indicated in FIG. 11. So, for the parent node, the more useful information for properly handling the transmission during the (k−1)-th slot would be that the MT cannot receive data during the last four symbols instead of the actual value of $T_O$.

If $T_{symbol}$ denotes the symbol duration, which is known to IAB-node and parent node, then according to some of the disclosed embodiments, the information about $T_{M(T)-M(R)}$, $T_{M(T)-D(T)}$, and $T_{D(R)-D(T)}$ of the IAB node is provided to the parent node. The parent node could calculate the timing misalignment of the IAB MT and DU resources in number of symbols as:

misalignment between DU DL Tx and MT DL
$$Rx = R\{(T_{M(T)-M(R)} - T_{M(T)-D(T)})/T_{symbol}\};$$

misalignment between DU DL Tx and MT UL
$$Tx = R\{-T_{M(T)-D(T)}/T_{symbol}\};$$

misalignment between DU UL Rx and MT DL
$$Rx = R\{(T_{M(T)-M(R)} - T_{M(T)-D(T)} + T_{D(R)-D(T)})/T_{symbol}\};$$

misalignment between DU UL Rx and MT UL
$$Tx = R\{(T_{M(T)-D(T)} - T_{D(R)-D(T)})/T_{symbol}\}.$$

where the operator $R\{\bullet\}$ means rounding away from zero to the closest integer.

According to some embodiments, where information about four timing quantities $\Delta T_{M(R)}$, $\Delta T_{M(T)}$, $\Delta T_{D(T)}$ and $\Delta T_{D(R)}$ of the IAB node are provided to the parent node, the parent node could calculate the timing misalignment of the IAB MT and DU resources in number of symbols as:

misalignment between DU DL Tx and MT DL
$$Rx = R\{(\Delta T_{D(T)} - \Delta T_{M(R)})/T_{symbol}\};$$

misalignment between DU DL Tx and MT UL
$$Tx = R\{(\Delta T_{D(T)} - \Delta T_{M(T)})/T_{symbol}\};$$

misalignment between DU UL Rx and MT DL
$$Rx = R\{(\Delta T_{D(R)} - \Delta T_{M(R)})/T_{symbol}\};$$

misalignment between DU UL Rx and MT UL
$$Tx = R\{(\Delta T_{D(R)} - \Delta T_{M(T)})/T_{symbol}\}.$$

According to some embodiments, where the information of the four timing-misalignment between the IAB MT and DU resources, denoted as $T_{D(T)-M(R)}$, $T_{D(T)-M(T)}$, $T_{D(R)-M(R)}$, and $T_{D(R)-M(T)}$, is provided directly to the parent node, the parent node could calculate them in number of symbols as:

misalignment between DU DL Tx and MT DL
$$Rx = R\{T_{D(T)-M(R)}/T_{symbol}\};$$

misalignment between DU DL Tx and MT UL
$$Tx = R\{(T_{D(T)-M(T)}/T_{symbol}\};$$

misalignment between DU UL Rx and MT DL
$$Rx = R\{T_{D(R)-M(R)}/T_{symbol}\};$$

misalignment between DU UL Rx and MT UL
$$Tx = R\{T_{D(R)-M(T)}/T_{symbol}\}.$$

In some examples, the information about timing offset provided by the IAB-node to the parent node according to any one of the disclosed embodiments, may correspond directly to units of $T_{symbol}$.

In some examples, the granularity/unit of the information of the IAB node, provided to the parent node according to any of the disclosed embodiments can be in number of symbols. In this case, the parent node can still use the formulas described previously to obtain the four timing-misalignment/offsets between the IAB MT and DU resources. By using the symbol unit, the provided timing information of the IAB node to the parent node can be carried by only a few bits. For example, the timing misalignment between IAB MT and DU resources is normally shorter than a slot duration which contains 14 symbols. Therefore, it is enough to use 4 bits to carry each of the timing.

In some examples, the calculations of parent node involve summation and/or subtraction operations. An inconsistency may arise when rounding the timing values to the number of symbols before or after conducting those operations, for example, the number of symbols resulting from $R\{T_{M(T)-M(R)}/T_{symbol}\}-R\{T_{M(T)-D(T)}/T_{symbol}\}$ may be different from the number resulted from $R\{(T_{M(T)-M(R)}-T_{M(T)-D(T)})/T_{symbol}\}$. The parent node may then need to perform and evaluation on the calculated timing values and adapt the results for certain scheduling requirements. In one example, the parent node may count one more symbol for each timing misalignment. The calculations of the parent node in some of the disclosed embodiments do not involve summation and/or subtraction operations. In these cases the IAB node may provide timing-misalignment information of the IAB node to the parent node in number of symbols.

The various embodiments will now be discussed further in relation to the Figures.

Figure 12:
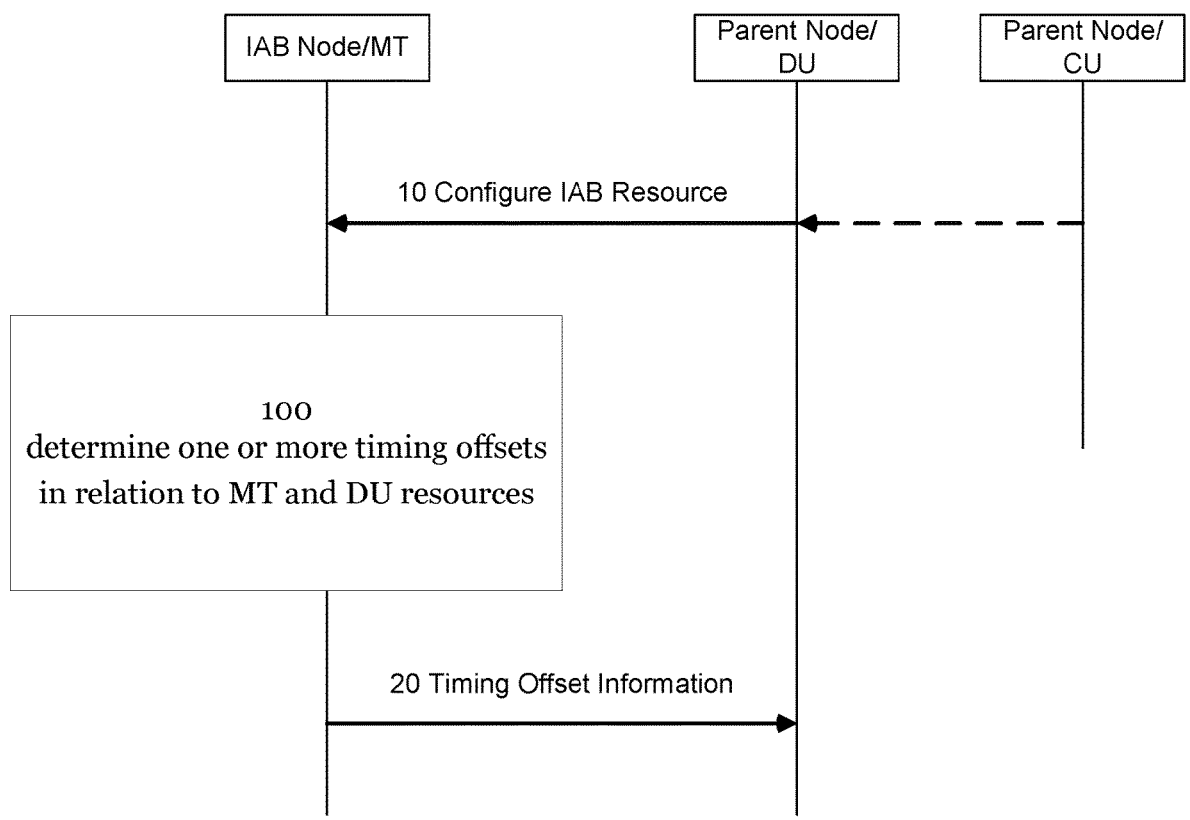
FIG. 12 shows a signaling sequence according to one or more embodiments of the present disclosure.

FIG. 12 depicts an example, basic signalling sequence between an IAB node and its parent IAB node. The parent node may configure 10 the IAB with certain time and frequency resources. As described above, the CU may send independent F1-AP messages that contain the resource configurations for each concerned IAB node and may contain further indications whether the configuration concerns the IAB node or its child. The IAB node determines 100 one or more timing offsets in relation to MT and DU resources and provides 20 the one or more timing offset information to the parent node. In some examples the IAB node performs the determining step independently from any configuration signalling from the IAB parent node.

Figure 13:
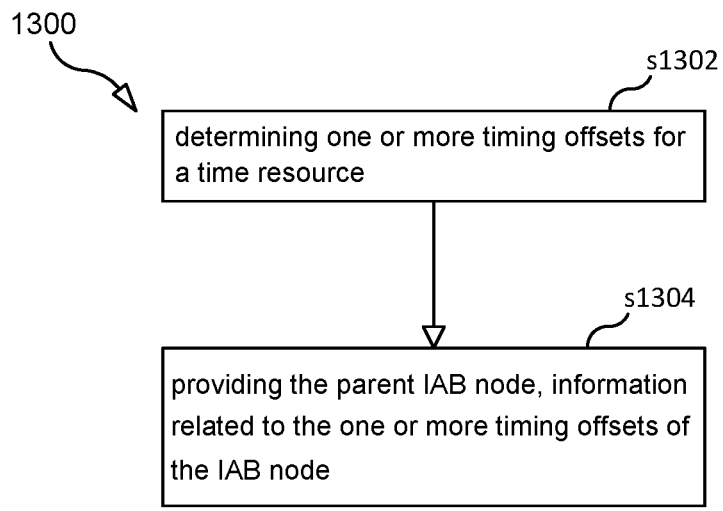
FIG. 13 shows a flow chart according to one or more embodiments of the present disclosure.

FIG. 13 is an example method 1300 performed by an IAB node. The IAB comprises a mobile termination, MT, and a radio interface distributed unit, DU. The MT terminates the radio interface layers of a backhaul interface towards a parent node and the DU interfaces user equipment, UE, and/or MTs of another IAB node. The method begins at s1302 with the IAB node determining one or more timing offsets for a time resource for a resource type. The offsets being in relation to/corresponding to an MT and/or a DU resource of the IAB node. In other examples the IAB node may obtain the one or more timing offsets. The method proceeds with the IAB node providing s1304, to the parent IAB node, information related to the one or more timing offsets of the IAB node. The information may enable the parent node to determine the four timing misalignments between the MT and DU uplink and downlink time resources, as described previously. In some examples the one or more timing offsets is in relation to/corresponding to a frame and/or slot timing of the MT and/or DU resource. In some examples the one or more timing offsets comprises at least one of the following:
- an offset between DU downlink transmission and MT downlink reception;
- an offset between DU downlink transmission and MT uplink transmission;
- an offset between DU uplink reception and MT downlink reception; and
- an offset between DU uplink reception and MT uplink transmission.

In some examples the information related to the one or more timing offsets corresponds to a timing difference between one of the DU resources or one of the MT resources and any one of the other DU or MT resources.

In some examples the one or more timing offsets comprises a set of 3 offset timings, wherein the set comprises a timing for each of an M(T), an M(R), a D(T) and a D(R) timing, wherein M(T) corresponds to the MT uplink transmission timing; M(R) corresponds to MT downlink reception timing; D(T) corresponds to DU downlink transmission timing; and D(R) corresponds to DU uplink reception timing. In further examples the set comprises one of the values in the column "values provided to the parent node" of Table 3 above.

In another example, each of the one or more timing offsets corresponds to a timing difference, ΔT, between one of the DU resources or one of the MT resources and a reference time. The reference time may be common to each of the DU and/or MT time-resource allocations. The one or more timing offsets may further comprise $\Delta T_{M(T)}$, $\Delta T_{M(R)}$, $\Delta T_{D(T)}$ and $\Delta T_{D(R)}$, where M(T) corresponds to the MT uplink transmission timing; M(R) corresponds to MT downlink reception timing; D(T) corresponds to DU downlink transmission timing; and D(R) corresponds to DU uplink reception timing.

In some examples the one or more timing offsets have orthogonal frequency-division multiplexing, OFDM, symbol granularity.

In other examples the IAB node obtains or determines a set of timing quantities which are indicative of one or more timing offsets between an MT resource and a DU resource of the IAB node. The set of timing quantities may comprise a timing difference between one of the DU resource timing or one of the MT resource timing and any one of the other DU or MT resource timing. The resource timing may correspond to frame and/or slot timings. In further examples the set of timing quantities comprise timing differences measured from each of: a downlink transmitted DU frame and/or slot timing; an uplink received DU frame and/or slot timing; an uplink transmitted MT frame and/or slot timing; and a downlink received MT frame and/or slot timing.

Figure 14:
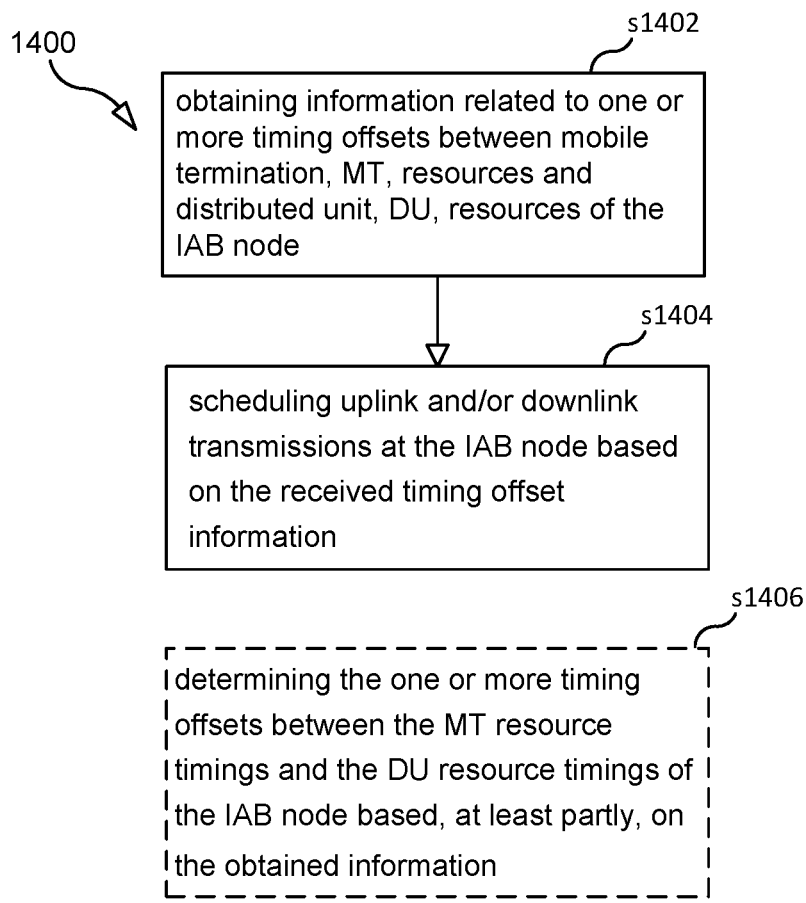
FIG. 14 shows a flow chart according to one or more embodiments of the present disclosure.

FIG. 14 is an example method 1400 performed by a parent IAB node. The parent IAB node may configure an IAB node with time and frequency resource allocations for MT and DU uplink and downlink transmission and reception and may subsequently provide scheduling for uplink and/or downlink transmission and reception on at least some of the time and frequency resources. The method begins at step s1402 with the parent node obtaining information related to one or more timing offsets between mobile termination, MT, resources and distributed unit, DU, resources of the IAB node. The method proceeds with the IAB parent node scheduling s1404 uplink and/or downlink transmissions at the IAB node based on the obtained information related to one or more timing offsets.

In some examples the one or more timing offsets is in relation to/corresponding to a frame and/or slot timing of the MT and/or DU resource. In some examples the one or more timing offsets comprise any one of the following:
- offset between DU downlink transmission and MT downlink reception;
- offset between DU downlink transmission and MT uplink transmission;
- offset between DU uplink reception and MT downlink reception; and
- offset between DU uplink reception and MT uplink transmission.

In further examples the information related to the one or more timing offsets corresponds to a timing difference between one of the DU resources or one of the MT resources and any one of the other DU or MT resources.

In some examples the method includes the optional step s1406, further comprising the parent node determining the one or more timing offsets between the MT resource timings and the DU resource timings of the IAB node based, at least partly, on the obtained information related to the one or more timing offsets.

In some examples the one or more offsets comprises three timing difference values, each value corresponding to the timing difference between a different one of the DU resource timing or one of the MT resource timing and any one of the other DU or MT resource timings, and based on the three timing difference values, the parent node determining:
- the offset between DU downlink transmission and MT downlink reception;
- the offset between DU downlink transmission and MT uplink transmission;
- the offset between DU uplink reception and MT downlink reception; and
- the offset between DU uplink reception and MT uplink transmission.

In some examples the one or more timing offsets comprises a set of 3 offset timings, wherein the set comprises a timing for each of an M(T), an M(R), a D(T) and a D(R) timing, wherein M(T) corresponds to the MT uplink transmission timing; M(R) corresponds to MT downlink reception timing; D(T) corresponds to DU downlink transmission timing; and D(R) corresponds to DU uplink reception timing. In some further examples the set comprises one values in the column "values provided to the parent node" of Table 3 above.

In some examples the offset between DU downlink transmission and MT downlink reception is denoted as the offset between DU downlink transmission and MT downlink reception is denoted as $T_{D(T)-M(R)}$; the offset between DU downlink transmission and MT uplink transmission is denoted as $T_{D(T)-M(T)}$; the offset between DU uplink reception and MT downlink reception is denoted as $T_{D(R)-M(R)}$; and the offset between DU uplink reception and MT uplink transmission is denoted as $T_{D(R)-M(T)}$ and when the information corresponds to the values in the column "values provided to the parent node" of Table 3 above, the IAB parent node determines the timing offsets in accordance with the column "Parent node calculates the four required values" and the corresponding row of Table 3 above.

In other examples the one or more timing offsets corresponds to a timing difference, ΔT, between one of the DU frame and/or slot timings or one of the MT frame and/or slot timings and a reference time. The reference time may be common to each of the DU and/or MT time-resource allocations. In some further examples the one or more timing offsets corresponds to $\Delta T_{M(T)}$, $\Delta T_{M(R)}$, $\Delta T_{D(T)}$ and $\Delta T_{D(R)}$, wherein M(T) corresponds to the MT uplink transmission frame and/or slot timing; M(R) corresponds to MT downlink reception; D(T) corresponds to DU downlink transmission; and D(R) corresponds to DU uplink reception, and the parent node determines:
- the offset between DU downlink transmission and MT downlink reception, denoted as $T_{D(T)-M(R)} = \Delta T_{D(T)} - \Delta T_{M(R)}$;
- the offset between DU downlink transmission and MT uplink transmission is denoted as $T_{D(T)-M(T)} = \Delta T_{D(T)} - \Delta T_{M(T)}$;
- the offset between DU uplink reception and MT downlink reception is denoted as $T_{D(R)-M(R)} = \Delta T_{D(R)} - \Delta T_{M(R)}$; and
- the offset between DU uplink reception and MT uplink transmission is denoted as $T_{D(R)-M(T)} = \Delta T_{D(R)} - \Delta T_{M(T)}$.

In some examples the one or more timing offsets have orthogonal frequency-division multiplexing, OFDM, symbol granularity.

In some examples parent node adds one symbol to each determined timing offset.

In some examples the information is obtained by the parent node via signalling from the IAB node.

In some examples the parent node is a donor IAB node, in other words it is the IAB node which connects to the core network.

Figure 15:
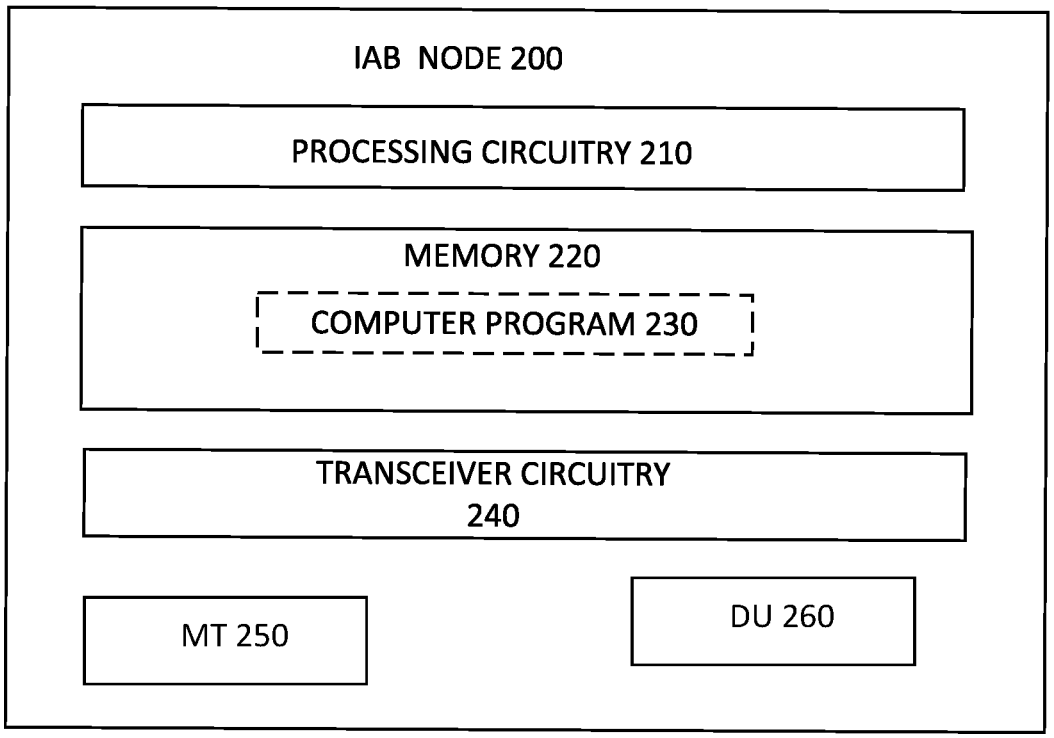
FIG. 15 is a block diagram illustrating an example IAB node according to one or more embodiments of the present disclosure.

FIG. 15 illustrates and example IAB node 200. The IAB node may comprise a number of logical functional units, for example processing circuitry 210, memory 220 comprising a computer program 230, transceiver circuitry 240 for transmitting and receiving signals for example to/from a parent IAB node, a child IAB node and/or wireless devices, mobile termination (MT) 250 and distribution unit (DU) 260. In some embodiments the IAB node 200 is configured to determine one or more timing offsets for a time resource, the offsets being in relation to/corresponding to an MT and/or a DU resource of the IAB node. The IAB node may be further configured to provide to a parent IAB node, information related to the one or more timing offsets of the IAB node.

In some examples the one or more timing offsets is in relation to/corresponding to a frame and/or slot timing of the MT and/or DU resource. In other examples the one or more timing offsets comprises at least one of the following:
- an offset between DU downlink transmission and MT downlink reception;
- an offset between DU downlink transmission and MT uplink transmission;
- an offset between DU uplink reception and MT downlink reception; and
- an offset between DU uplink reception and MT uplink transmission.

In some examples the information related to the one or more timing offsets corresponds to a timing difference between one of the DU resources or one of the MT resources and any one of the other DU or MT resources.

In some examples the one or more timing offsets comprises a set of 3 offset timings, wherein the set comprises a timing for each of an M(T), an M(R), a D(T) and a D(R) timing, wherein M(T) corresponds to the MT uplink transmission timing; M(R) corresponds to MT downlink reception timing; D(T) corresponds to DU downlink transmission timing; and D(R) corresponds to DU uplink reception timing. In further examples the set comprises one of the values in the column "values provided to the parent node" of Table 3 above.

In another example, each of the one or more timing offsets corresponds to a timing difference, ΔT, between one of the DU resources or one of the MT resources and a reference time. The reference time may be common to each of the DU and/or MT time-resource allocations. The one or more timing offsets may further comprise $\Delta T_{M(T)}$, $\Delta T_{M(R)}$, $\Delta T_{D(T)}$ and $\Delta T_{D(R)}$, where M(T) corresponds to the MT uplink transmission timing; M(R) corresponds to MT downlink reception timing; D(T) corresponds to DU downlink transmission timing; and D(R) corresponds to DU uplink reception timing.

In some examples the one or more timing offsets have orthogonal frequency-division multiplexing, OFDM, symbol granularity.

In other examples the IAB node 200 is configured to obtain or determine a set of timing quantities which are indicative of one or more timing offsets between an MT resource and a DU resource of the IAB node. The set of timing quantities may comprise a timing difference between one of the DU resource timing or one of the MT resource timing and any one of the other DU or MT resource timing. The resource timing may correspond to frame and/or slot timings. In further examples the set of timing quantities comprise timing differences measured from each of: a downlink transmitted DU frame and/or slot timing; an uplink received DU frame and/or slot timing; an uplink transmitted MT frame and/or slot timing; and a downlink received MT frame and/or slot timing.

Figure 16:
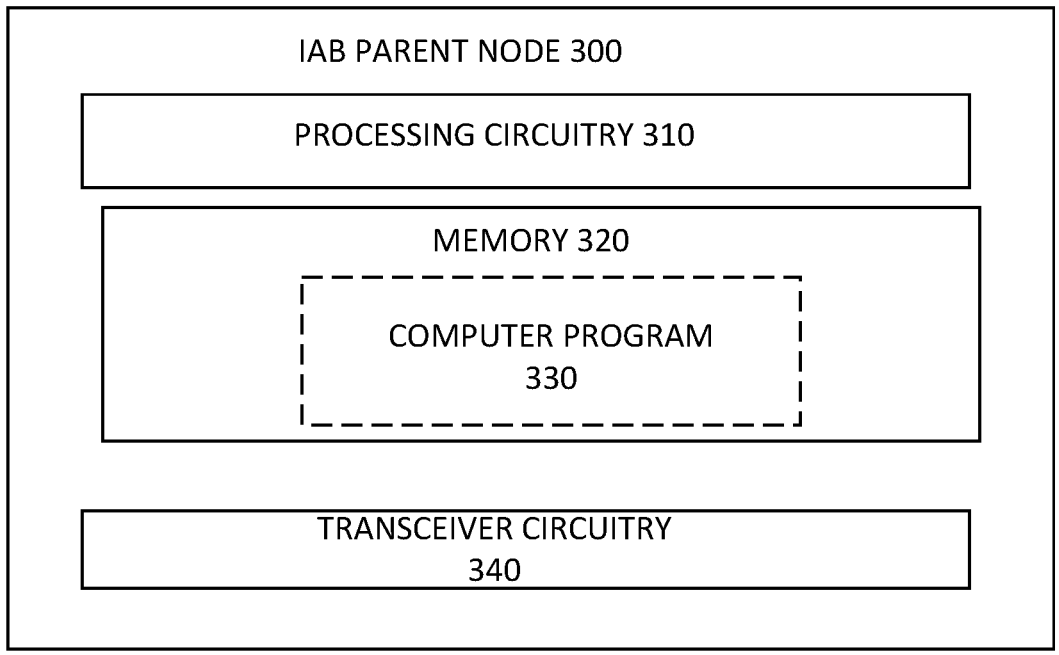
FIG. 16 is a block diagram illustrating an example IAB parent node according to one or more embodiments of the present disclosure.

FIG. 16 illustrates and example IAB parent node 300. A parent IAB node is an IAB node which has capabilities to serve a second IAB node The IAB parent node 300 may comprise a number of logical functional units, for example processing circuitry 310, memory 320 comprising a computer program 330, transceiver circuitry 340 for transmitting and receiving signals for example to/from the second or served IAB node. In some embodiments the IAB parent node 300 is configured to obtain information related to one or more timing offsets between mobile termination, MT, resources and distributed unit, DU, resources of the second or served IAB node. The IAB parent node 300 may also be configured to schedule uplink and/or downlink transmissions at the second or served IAB node based on the one or more timing offsets.

In some examples the one or more timing offsets is in relation to/corresponding to a frame and/or slot timing of the MT and/or DU resource. In some examples the one or more timing offsets comprise any one of the following:
- offset between DU downlink transmission and MT downlink reception;
- offset between DU downlink transmission and MT uplink transmission;
- offset between DU uplink reception and MT downlink reception; and
- offset between DU uplink reception and MT uplink transmission.

In further examples the information related to the one or more timing offsets corresponds to a timing difference between one of the DU resources or one of the MT resources and any one of the other DU or MT resources.

In some examples the parent node 300 is configured to determine the one or more timing offsets between the MT resource timings and the DU resource timings of the IAB node based, at least partly, on the information related to the one or more timing offsets.

In some examples the one or more offsets comprises three timing difference values, each value corresponding to the timing difference between a different one of the DU resource timing or one of the MT resource timing and any one of the other DU or MT resource timings, and based on the three timing difference values, the parent node determining:
- the offset between DU downlink transmission and MT downlink reception;
- the offset between DU downlink transmission and MT uplink transmission;
- the offset between DU uplink reception and MT downlink reception; and
- the offset between DU uplink reception and MT uplink transmission.

In some examples the one or more timing offsets comprises a set of 3 offset timings, wherein the set comprises a timing for each of an M(T), an M(R), a D(T) and a D(R) timing, wherein M(T) corresponds to the MT uplink transmission timing; M(R) corresponds to MT downlink reception timing; D(T) corresponds to DU downlink transmission timing; and D(R) corresponds to DU uplink reception timing. In some further examples the set comprises one values in the column "values provided to the parent node" of Table 3 above.

In some examples the offset between DU downlink transmission and MT downlink reception is denoted as the offset between DU downlink transmission and MT downlink reception is denoted as $T_{D(T)-M(R)}$; the offset between DU downlink transmission and MT uplink transmission is denoted as $T_{D(T)-M(T)}$; the offset between DU uplink reception and MT downlink reception is denoted as $T_{D(R)-M(R)}$; and the offset between DU uplink reception and MT uplink transmission is denoted as $T_{D(R)-M(T)}$ and when the information corresponds to the values in the column "values provided to the parent node" of Table 3 above, the IAB parent node determines the timing offsets in accordance with the column "Parent node calculates the four required values" and the corresponding row of Table 3 above.

In other examples the one or more timing offsets corresponds to a timing difference, $\Delta T$, between one of the DU frame and/or slot timings or one of the MT frame and/or slot timings and a reference time. The reference time may be common to each of the DU and/or MT time-resource allocations. In some further examples the one or more timing offsets corresponds to $\Delta T_{M(T)}$, $\Delta T_{M(R)}$, $\Delta T_{D(T)}$ and $\Delta T_{D(R)}$, wherein M(T) corresponds to the MT uplink transmission frame and/or slot timing; M(R) corresponds to MT downlink reception; D(T) corresponds to DU downlink transmission; and D(R) corresponds to DU uplink reception, and the parent node 300 determines:
- the offset between DU downlink transmission and MT downlink reception, denoted as $T_{D(T)-M(R)}=\Delta T_{D(T)}-\Delta T_{M(R)}$;
- the offset between DU downlink transmission and MT uplink transmission is denoted as $T_{D(T)-M(T)}=\Delta T_{D(T)}-\Delta T_{M(T)}$;
- the offset between DU uplink reception and MT downlink reception is denoted as $T_{D(R)-M(R)}=\Delta T_{D(R)}-\Delta T_{M(R)}$; and
- the offset between DU uplink reception and MT uplink transmission is denoted as $T_{D(R)-M(T)}=\Delta T_{D(R)}-\Delta T_{M(T)}$.

In some examples the one or more timing offsets have orthogonal frequency-division multiplexing, OFDM, symbol granularity.

In some examples parent node 300 is configured to add one symbol to each determined timing offset.

In some examples the information is obtained by the parent node 300 via signalling from the IAB node.

In some examples the parent node 300 is a donor IAB node, in which case it would include means to connect to the core network such as a network interface.

Figure 17:
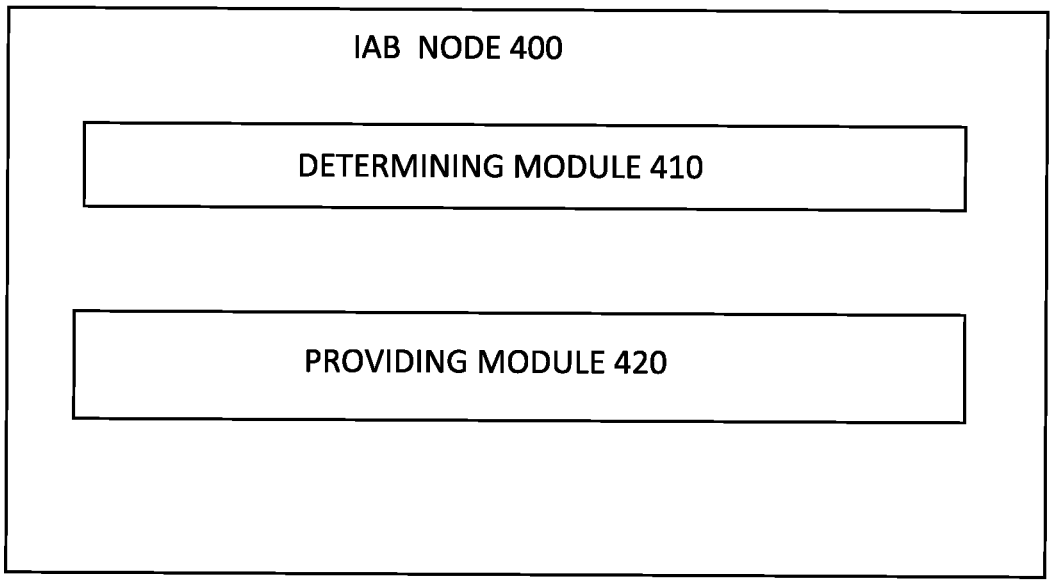
FIG. 17 is a block diagram illustrating an example IAB node comprising software modules according to one or more embodiments of the present disclosure.

FIG. 17 is a block diagram illustrating an example IAB node 400 comprising software modules according to one or more embodiments of the present disclosure. The determining module 410 may be configured to perform one or more of the methods previously described for determining one or more timing offsets for a time resource, the offsets being in relation to/corresponding to an MT and/or a DU resource of the IAB node. The providing module 420 may be configured to perform one or more of the methods previously described for providing to the parent IAB node, information related to the one or more timing offsets of the IAB node.

Figure 18:
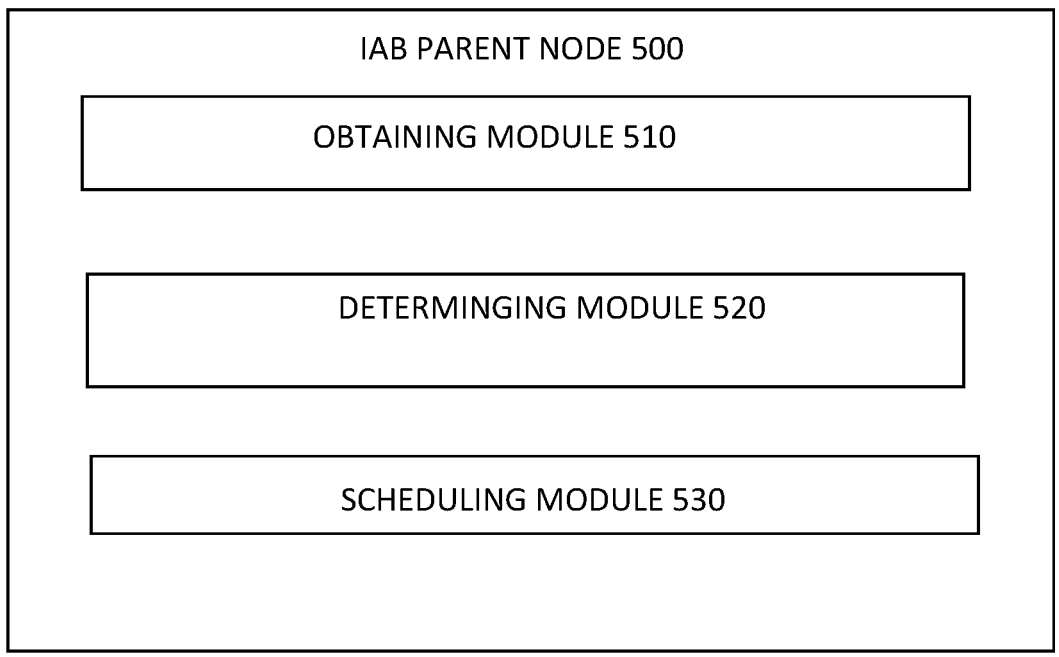
FIG. 18 is a block diagram illustrating an example IAB parent node comprising software modules according to one or more embodiments of the present disclosure.

FIG. 18 is a block diagram illustrating an example IAB parent node 500 comprising software modules according to one or more embodiments of the present disclosure. Obtaining module 510 may be configured to perform one or more of the methods previously described for obtaining information related to one or more timing offsets between mobile termination, MT, resources and distributed unit, DU, resources of the IAB node. Scheduling module 530 may be configured to perform one or more of the methods previously described for scheduling uplink and/or downlink transmissions at the IAB node based on the one or more timing offsets. IAB parent node 500 may optionally comprise determining module 520 which may be configured to perform one or more of the methods previously described for determining the one or more timing offsets between the MT resource timings and the DU resource timings of the IAB node based, at least partly, on the obtained information related to the one or more timing offsets.

Figure 19:
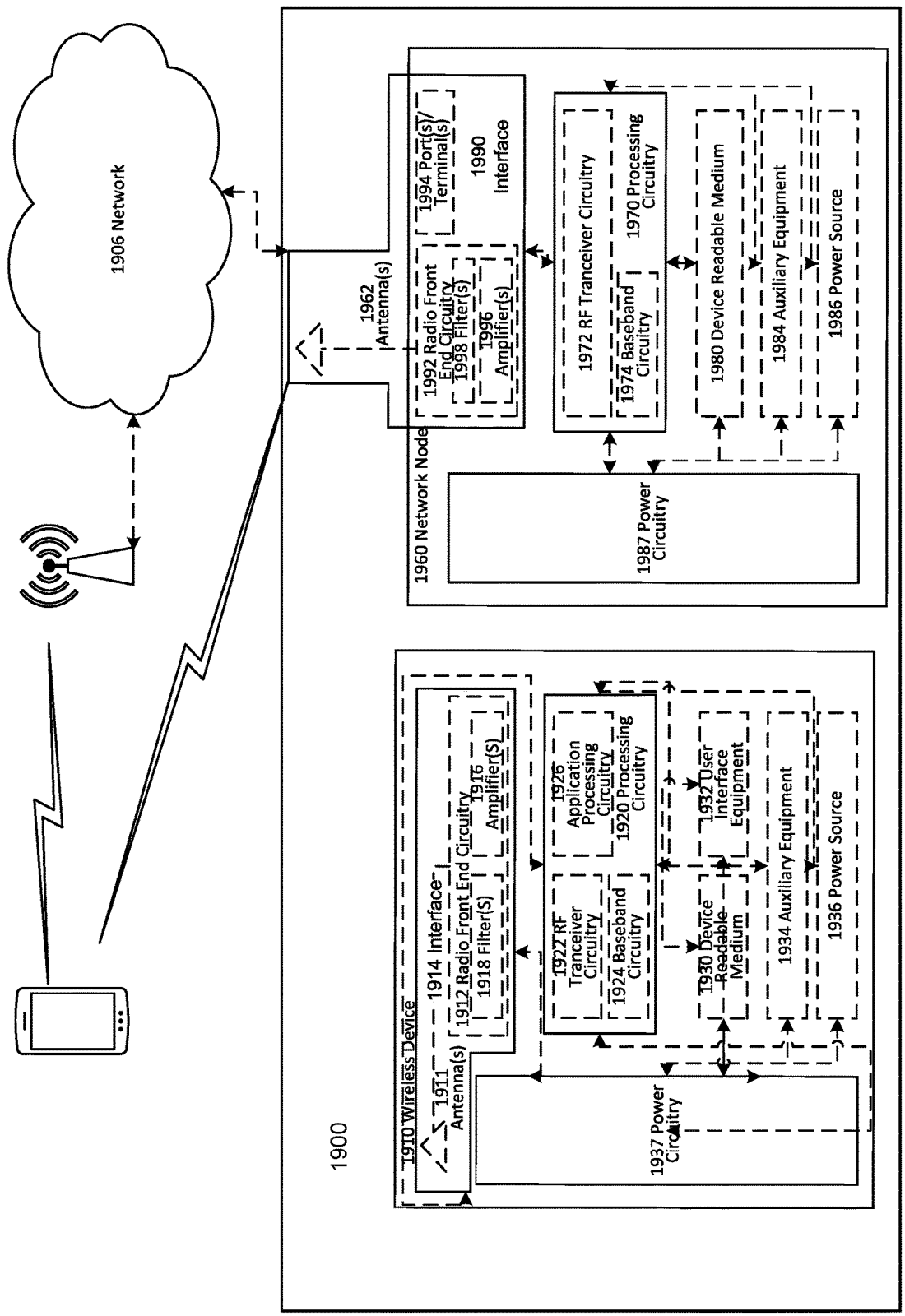
FIG. 19 is a diagram depicting an example structure of an IAB node.

FIG. 19 depicts an example structure of an IAB node 1900 comprising MT 1910 and DU 1960 entities. The DU entities are depicted separated to highlight the independence of the functions. Although the subject matter described herein may be implemented in any appropriate type of system using any suitable components, the embodiments disclosed herein are described in relation to a wireless network, such as the example wireless network illustrated in FIG. 19. In practice, a wireless network may further include any additional elements suitable to support communication between wireless devices or between a wireless device and another communication device, such as a landline telephone, a service provider, or any other network node or end device. Of the illustrated components, DU 1960 and MT 1910 are depicted with additional detail. It should be noted that these functions may be logically and/or physically separated or combined within an IAB node. The wireless network may provide communication and other types of services to one or more wireless devices to facilitate the wireless devices' access to and/or use of the services provided by, or via, the IAB node 1900.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

DU 1960 and MT 1910 comprise various components described in more detail below. These components work together in order to provide IAB node 1900 functionality, such as providing wireless connections in a wireless network. Specifically, the entities described in further detail below are suitable to provide one or more of the embodiments disclosed herein.

In different embodiments, the wireless network may comprise any number of wired or wireless networks, IAB nodes, other network nodes, base stations, controllers, wireless devices, relay stations, and/or any other components or systems that may facilitate or participate in the communication of data and/or signals whether via wired or wireless connections.

As used herein, DU refers to equipment capable, configured, arranged and/or operable to communicate directly or indirectly with a wireless device and/or with other IAB nodes or equipment in the wireless network to enable and/or provide wireless access to the wireless device and/or to perform other functions (e.g., administration) in the wireless network. Examples of other network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, DU 1960 includes processing circuitry 1970, device readable medium 1980, interface 1990, auxiliary equipment 1984, power source 1986, power circuitry 1987, and antenna 1962. Although DU 1960 illustrated in the example wireless network of FIG. 19 may represent a device that includes the illustrated combination of hardware components, other embodiments may comprise DUs with different combinations of components. It is to be understood that a DU comprises any suitable combination of hardware and/or software needed to perform the tasks, features, functions and methods disclosed herein. Moreover, while the components of DU 1960 are depicted as single boxes located within a larger box, or nested within multiple boxes, in practice, a DU may comprise multiple different physical components that make up a single illustrated component (e.g., device readable medium 1980 may comprise multiple separate hard drives as well as multiple RAM modules).

Similarly, D U 1960 may be composed of multiple physically separate components which may each have their own respective components. In some embodiments, DU 1960 may be configured to support multiple radio access technologies (RATs). In such embodiments, some components may be duplicated (e.g., separate device readable medium 1980 for the different RATs) and some components may be reused (e.g., the same antenna 1962 may be shared by the RATs). DU 1960 may also include multiple sets of the various illustrated components for different wireless technologies integrated into DU 1960, such as, for example, GSM, WCDMA, LTE, NR, WiFi, or Bluetooth wireless technologies. These wireless technologies may be integrated into the same or different chip or set of chips and other components within DU 1960.

Processing circuitry 1970 is configured to perform any determining, calculating, or similar operations (e.g., certain obtaining operations) described herein as being provided by a DU. These operations performed by processing circuitry 1970 may include processing information obtained by processing circuitry 1970 by, for example, converting the obtained information into other information, comparing the obtained information or converted information to information stored in the DU, and/or performing one or more operations based on the obtained information or converted information, and as a result of said processing making a determination.

Processing circuitry 1970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other DU 1960 components, such as device readable medium 1980, DU 1960 functionality. For example, processing circuitry 1970 may execute instructions stored in device readable medium 1980 or in memory within processing circuitry 1970. Such functionality may include providing any of the various wireless features, functions, or benefits discussed herein. In some embodiments, processing circuitry 1970 may include a system on a chip (SOC).

In some embodiments, processing circuitry 1970 may include one or more of radio frequency (RF) transceiver circuitry 1972 and baseband processing circuitry 1974. In some embodiments, radio frequency (RF) transceiver circuitry 1972 and baseband processing circuitry 1974 may be on separate chips (or sets of chips), boards, or units, such as radio units and digital units. In alternative embodiments, part or all of RF transceiver circuitry 1972 and baseband processing circuitry 1974 may be on the same chip or set of chips, boards, or units.

In certain embodiments, some or all of the functionality described herein as being provided by an IAB node may be performed by processing circuitry 1970 executing instructions stored on device readable medium 1980 or memory within processing circuitry 1970. In alternative embodiments, some or all of the functionality may be provided by processing circuitry 1970 without executing instructions stored on a separate or discrete device readable medium, such as in a hard-wired manner. In any of those embodiments, whether executing instructions stored on a device readable storage medium or not, processing circuitry 1970 can be configured to perform the described functionality. The benefits provided by such functionality are not limited to processing circuitry 1970 alone or to other components of network node 1960, but are enjoyed by network node 1960 as a whole, and/or by end users and the wireless network generally.

Device readable medium 1980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1970. Device readable medium 1980 may store any suitable instructions, data or information, including a computer program, software, an application including one or more of logic, rules, code, tables, etc. and/or other instructions capable of being executed by processing circuitry 1970 and, utilized by network node 1960. Device readable medium 1980 may be used to store any calculations made by processing circuitry 1970 and/or any data received via interface 1990. In some embodiments, processing circuitry 1970 and device readable medium 1980 may be considered to be integrated.

Interface 1990 is used in the wired or wireless communication of signalling and/or data between the IAB node and other network nodes. As illustrated, interface 1990 comprises port(s)/terminal(s) 1994 to send and receive data, for example to and from network 1906 over a wired connection. Interface 1990 also includes radio front end circuitry 1992 that may be coupled to, or in certain embodiments a part of, antenna 1962. Radio front end circuitry 1992 comprises filters 1998 and amplifiers 1996. Radio front end circuitry 1992 may be connected to antenna 1962 and processing circuitry 1970. Radio front end circuitry may be configured to condition signals communicated between antenna 1962 and processing circuitry 1970. Radio front end circuitry 1992 may receive digital data that is to be sent out to other network nodes or wireless devices via a wireless connection. Radio front end circuitry 1992 may convert the digital data into a radio signal having the appropriate channel and bandwidth parameters using a combination of filters 1998 and/or amplifiers 1996. The radio signal may then be transmitted via antenna 1962. Similarly, when receiving data, antenna 1962 may collect radio signals which are then converted into digital data by radio front end circuitry 1992. The digital data may be passed to processing circuitry 1970. In other embodiments, the interface may comprise different components and/or different combinations of components.

In certain alternative embodiments, DU 1960 may not include separate radio front end circuitry 1992, instead, processing circuitry 1970 may comprise radio front end circuitry and may be connected to antenna 1962 without separate radio front end circuitry 1992. Similarly, in some embodiments, all or some of RF transceiver circuitry 1972 may be considered a part of interface 1990. In still other embodiments, interface 1990 may include one or more ports or terminals 1994, radio front end circuitry 1992, and RF transceiver circuitry 1972, as part of a radio unit (not shown), and interface 1990 may communicate with baseband processing circuitry 1974, which is part of a digital unit (not shown).

Antenna 1962 may include one or more antennas, or antenna arrays, configured to send and/or receive wireless signals. Antenna 1962 may be coupled to radio front end circuitry 1990 and may be any type of antenna capable of transmitting and receiving data and/or signals wirelessly. In some embodiments, antenna 1962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1962 may be separate from DU 1960 and may be connectable to DU 1960 through an interface or port.

Antenna 1962, interface 1990, and/or processing circuitry 1970 may be configured to perform any receiving operations and/or certain obtaining operations described herein as being performed by an IAB node. Any information, data and/or signals may be received from a wireless device, another IAB node or network node and/or any other network equipment. Similarly, antenna 1962, interface 1990, and/or processing circuitry 1970 may be configured to perform any transmitting operations described herein as being performed by an IAB node. Any information, data and/or signals may be transmitted to a wireless device, another IAB node or other network node and/or any other network equipment.

Power circuitry 1987 may comprise, or be coupled to, power management circuitry and is configured to supply the components of DU 1960 with power for performing the functionality described herein. Power circuitry 1987 may receive power from power source 1986. Power source 1986 and/or power circuitry 1987 may be configured to provide power to the various components of DU 1960 in a form suitable for the respective components (e.g., at a voltage and current level needed for each respective component). Power source 1986 may either be included in, or external to, power circuitry 1987 and/or DU 1960. For example, DU 1960 may be connectable to an external power source (e.g., an electricity outlet) via an input circuitry or interface such as an electrical cable, whereby the external power source supplies power to power circuitry 1987. As a further example, power source 1986 may comprise a source of power in the form of a battery or battery pack which is connected to, or integrated in, power circuitry 1987. The battery may provide backup power should the external power source fail. Other types of power sources, such as photovoltaic devices, may also be used.

Alternative embodiments of IAB node may include additional components beyond those shown in FIG. 19 that may be responsible for providing certain aspects of the IAB node's functionality, including any of the functionality described herein and/or any functionality necessary to support the subject matter described herein. For example, IAB node may include user interface equipment to allow input of information into the IAB node and to allow output of information from IAB node. This may allow a user to perform diagnostic, maintenance, repair, and other administrative functions.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, MT 1910 may include antenna 1911, interface 1914, processing circuitry 1920, device readable medium 1930, user interface equipment 1932, auxiliary equipment 1934, power source 1936 and power circuitry 1937. MT 1910 may include multiple sets of one or more of the illustrated components for different wireless technologies supported by MT 1910, such as, for example, GSM, WCDMA, LTE, NR, WiFi, WiMAX, or Bluetooth wireless technologies, just to mention a few. These wireless technologies may be integrated into the same or different chips or set of chips as other components within MT 1910.

Antenna 1911 may include one or more antennas or antenna arrays, configured to send and/or receive wireless signals, and is connected to interface 1914. In certain alternative embodiments, antenna 1911 may be separate from MT 1910 and be connectable to MT 1910 through an interface or port. Antenna 1911, interface 1914, and/or processing circuitry 1920 may be configured to perform any receiving or transmitting operations described herein as being performed by a DU. Any information, data and/or signals may be received from a network node and/or another DU. In some embodiments, radio front end circuitry and/or antenna 1911 may be considered an interface.

As illustrated, interface 1914 comprises radio front end circuitry 1912 and antenna 1911. Radio front end circuitry 1912 comprise one or more filters 1918 and amplifiers 1916. Radio front end circuitry 1914 is connected to antenna 1911 and processing circuitry 1920, and is configured to condition signals communicated between antenna 1911 and processing circuitry 1920. Radio front end circuitry 1912 may be coupled to or a part of antenna 1911. In some embodiments, MT 1910 may not include separate radio front end circuitry 1912; rather, processing circuitry 1920 may comprise radio front end circuitry and may be connected to antenna 1911. Similarly, in some embodiments, some or all of RF transceiver circuitry 1922 may be considered a part of interface 1914. Radio front end circuitry 1912 may receive digital data that is to be sent out to other network nodes or DUs via a wireless connection. Radio front end circuitry 1912 may convert the digital data into a radio signal having the appropriate channel and bandwidth parameters using a combination of filters 1918 and/or amplifiers 1916. The radio signal may then be transmitted via antenna 1911. Similarly, when receiving data, antenna 1911 may collect radio signals which are then converted into digital data by radio front end circuitry 1912. The digital data may be passed to processing circuitry 1920. In other embodiments, the interface may comprise different components and/or different combinations of components.

Processing circuitry 1920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other MT 1910 components, such as device readable medium 1930, MT 1910 functionality. Such functionality may include providing any of the various wireless features or benefits discussed herein. For example, processing circuitry 1920 may execute instructions stored in device readable medium 1930 or in memory within processing circuitry 1920 to provide the functionality disclosed herein.

As illustrated, processing circuitry 1920 includes one or more of RF transceiver circuitry 1922, baseband processing circuitry 1924, and application processing circuitry 1926. In other embodiments, the processing circuitry may comprise different components and/or different combinations of components. In certain embodiments processing circuitry 1920 of MT 1910 may comprise a SOC. In some embodiments, RF transceiver circuitry 1922, baseband processing circuitry 1924, and application processing circuitry 1926 may be on separate chips or sets of chips. In alternative embodiments, part or all of baseband processing circuitry 1924 and application processing circuitry 1926 may be combined into one chip or set of chips, and RF transceiver circuitry 1922 may be on a separate chip or set of chips. In still alternative embodiments, part or all of RF transceiver circuitry 1922 and baseband processing circuitry 1924 may be on the same chip or set of chips, and application processing circuitry 1926 may be on a separate chip or set of chips. In yet other alternative embodiments, part or all of RF transceiver circuitry 1922, baseband processing circuitry 1924, and application processing circuitry 1926 may be combined in the same chip or set of chips. In some embodiments, RF transceiver circuitry 1922 may be a part of interface 1914. RF transceiver circuitry 1922 may condition RF signals for processing circuitry 1920.

In certain embodiments, some or all of the functionality described herein as being performed by a DU may be provided by processing circuitry 1920 executing instructions stored on device readable medium 1930, which in certain embodiments may be a computer-readable storage medium. In alternative embodiments, some or all of the functionality may be provided by processing circuitry 1920 without executing instructions stored on a separate or discrete device readable storage medium, such as in a hard-wired manner. In any of those particular embodiments, whether executing instructions stored on a device readable storage medium or not, processing circuitry 1920 can be configured to perform the described functionality.

Processing circuitry 1920 may be configured to perform any determining, calculating, or similar operations (e.g., certain obtaining operations) described herein as being performed by the IAB node. These operations, as performed by processing circuitry 1920, may include processing information obtained by processing circuitry 1920 by, for example, converting the obtained information into other information, comparing the obtained information or converted information to information stored by MT 1910, and/or performing one or more operations based on the obtained information or converted information, and as a result of said processing making a determination.

Device readable medium 1930 may be operable to store a computer program, software, an application including one or more of logic, rules, code, tables, etc. and/or other instructions capable of being executed by processing circuitry 1920. Device readable medium 1930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1920. In some embodiments, processing circuitry 1920 and device readable medium 1930 may be considered to be integrated.

User interface equipment 1932 may provide components that allow for a human user to interact with the IAB node. Such interaction may be of many forms, such as visual, audial, tactile, etc. User interface equipment 1932 may be operable to produce output to the user and to allow the user to provide input to the IAB node.

Power source 1936 may, in some embodiments, be in the form of a battery or battery pack. Other types of power sources, such as an external power source (e.g., an electricity outlet), photovoltaic devices or power cells, may also be used. MT 1910 may further comprise power circuitry 1937 for delivering power from power source 1936 to the various parts of MT 1910 which need power from power source 1936 to carry out any functionality described or indicated herein. Power circuitry 1937 may in certain embodiments comprise power management circuitry. Power circuitry 1937 may additionally or alternatively be operable to receive power from an external power source; in which case MT 1910 may be connectable to the external power source (such as an electricity outlet) via input circuitry or an interface such as an electrical power cable. Power circuitry 1937 may also in certain embodiments be operable to deliver power from an external power source to power source 1936. This may be, for example, for the charging of power source 1936. Power circuitry 1937 may perform any formatting, converting, or other modification to the power from power source 1936 to make the power suitable for the respective components of MT 1910 to which power is supplied.

Figure 20:
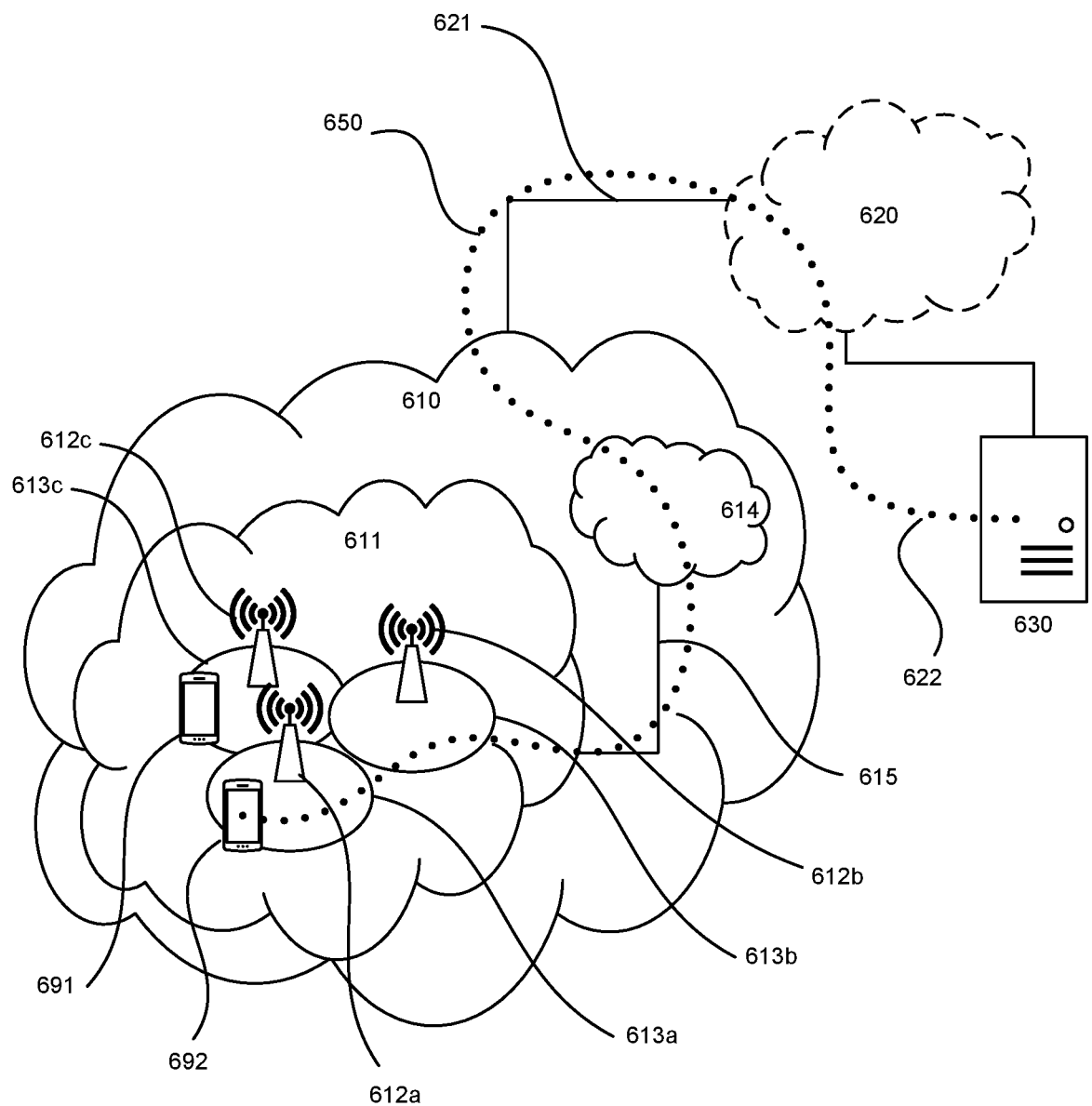
FIG. 20 schematically illustrates a telecommunication network connected via an intermediate network to a host computer.

With reference to FIG. 20, in accordance with an embodiment, a communication system includes a telecommunication network 610, such as a 3GPP-type cellular network, which comprises an access network 611, such as a radio access network, and a core network 614. The access network 611 comprises a plurality of network nodes or base stations 612*a*, 612*b*, 612*c*, such as NBs, eNBs, gNBs or other types of wireless access points, each defining a corresponding coverage area 613*a*, 613*b*, 613*c*. Each network node or base station 612*a*, 612*b*, 612*c* is connectable to the core network 614 over a wired or wireless connection 615. A first wireless device 691 located in coverage area 613*c* is configured to wirelessly connect to, or be paged by, the corresponding base station 612*c*. A second wireless device 692 in coverage area 613*a* is wirelessly connectable to the corresponding base station 612*a*. While a plurality of wireless devices 691, 692 are illustrated in this example, the disclosed embodiments are equally applicable to a situation where a sole wireless device is in the coverage area or where a sole wireless device is connecting to the corresponding base station 612.

The telecommunication network 610 is itself connected to a host computer 630, which may be embodied in the hardware and/or software of a standalone server, a cloud-implemented server, a distributed server or as processing resources in a server farm. The host computer 630 may be under the ownership or control of a service provider, or may be operated by the service provider or on behalf of the service provider. The connections 621, 622 between the telecommunication network 610 and the host computer 630 may extend directly from the core network 614 to the host computer 630 or may go via an optional intermediate network 620. The intermediate network 620 may be one of, or a combination of more than one of, a public, private or hosted network; the intermediate network 620, if any, may be a backbone network or the Internet; in particular, the intermediate network 620 may comprise two or more sub-networks (not shown).

The communication system of FIG. 20 as a whole enables connectivity between one of the connected wireless devices 691, 692 and the host computer 630. The connectivity may be described as an over-the-top (OTT) connection 650. The host computer 630 and the connected UEs 691, 692 are configured to communicate data and/or signaling via the OTT connection 650, using the access network 611, the core network 614, any intermediate network 620 and possible further infrastructure (not shown) as intermediaries. The OTT connection 650 may be transparent in the sense that the participating communication devices through which the OTT connection 650 passes are unaware of routing of uplink and downlink communications. For example, a base station 612 may not or need not be informed about the past routing of an incoming downlink communication with data originating from a host computer 630 to be forwarded (e.g., handed over) to a connected UE 691. Similarly, the base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 21. In a communication system 700, a host computer 710 comprises hardware 715 including a communication interface 716 configured to set up and maintain a wired or wireless connection with an interface of a different communication device of the communication system 700. The host computer 710 further comprises processing circuitry 718, which may have storage and/or processing capabilities. In particular, the processing circuitry 718 may comprise one or more programmable processors, application-specific integrated circuits, field programmable gate arrays or combinations of these (not shown) adapted to execute instructions. The host computer 710 further comprises software 711, which is stored in or accessible by the host computer 710 and executable by the processing circuitry 718. The software 711 includes a host application 712.

The host application 712 may be operable to provide a service to a remote user, such as a UE 730 connecting via an OTT connection 750 terminating at the UE 730 and the host computer 710. In providing the service to the remote user, the host application 712 may provide user data which is transmitted using the OTT connection 750.

The communication system 700 further includes a base station 720 provided in a telecommunication system and comprising hardware 725 enabling it to communicate with the host computer 710 and with the UE 730. The hardware 725 may include a communication interface 726 for setting up and maintaining a wired or wireless connection with an interface of a different communication device of the communication system 700, as well as a radio interface 727 for setting up and maintaining at least a wireless connection 770 with a UE 730 located in a coverage area (not shown in FIG. 7) served by the base station 720. The communication interface 726 may be configured to facilitate a connection 760 to the host computer 710. The connection 760 may be direct or it may pass through a core network (not shown in FIG. 21) of the telecommunication system and/or through one or more intermediate networks outside the telecommunication system. In the embodiment shown, the hardware 725 of the base station 720 further includes processing circuitry 728, which may comprise one or more programmable processors, application-specific integrated circuits, field programmable gate arrays or combinations of these (not shown) adapted to execute instructions. The base station 720 further has software 721 stored internally or accessible via an external connection.

The communication system 700 further includes the UE 730 already referred to. Its hardware 735 may include a radio interface 737 configured to set up and maintain a wireless connection 770 with a base station serving a coverage area in which the UE 730 is currently located. The hardware 735 of the UE 730 further includes processing circuitry 738, which may comprise one or more programmable processors, application-specific integrated circuits, field programmable gate arrays or combinations of these (not shown) adapted to execute instructions. The UE 730 further comprises software 731, which is stored in or accessible by the UE 730 and executable by the processing circuitry 738. The software 731 includes a client application 732. The client application 732 may be operable to provide a service to a human or non-human user via the UE 730, with the support of the host computer 710. In the host computer 710, an executing host application 712 may communicate with the executing client application 732 via the OTT connection 750 terminating at the UE 730 and the host computer 710. In providing the service to the user, the client application 732 may receive request data from the host application 712 and provide user data in response to the request data. The OTT connection 750 may transfer both the request data and the user data. The client application 732 may interact with the user to generate the user data that it provides.

Figure 21:
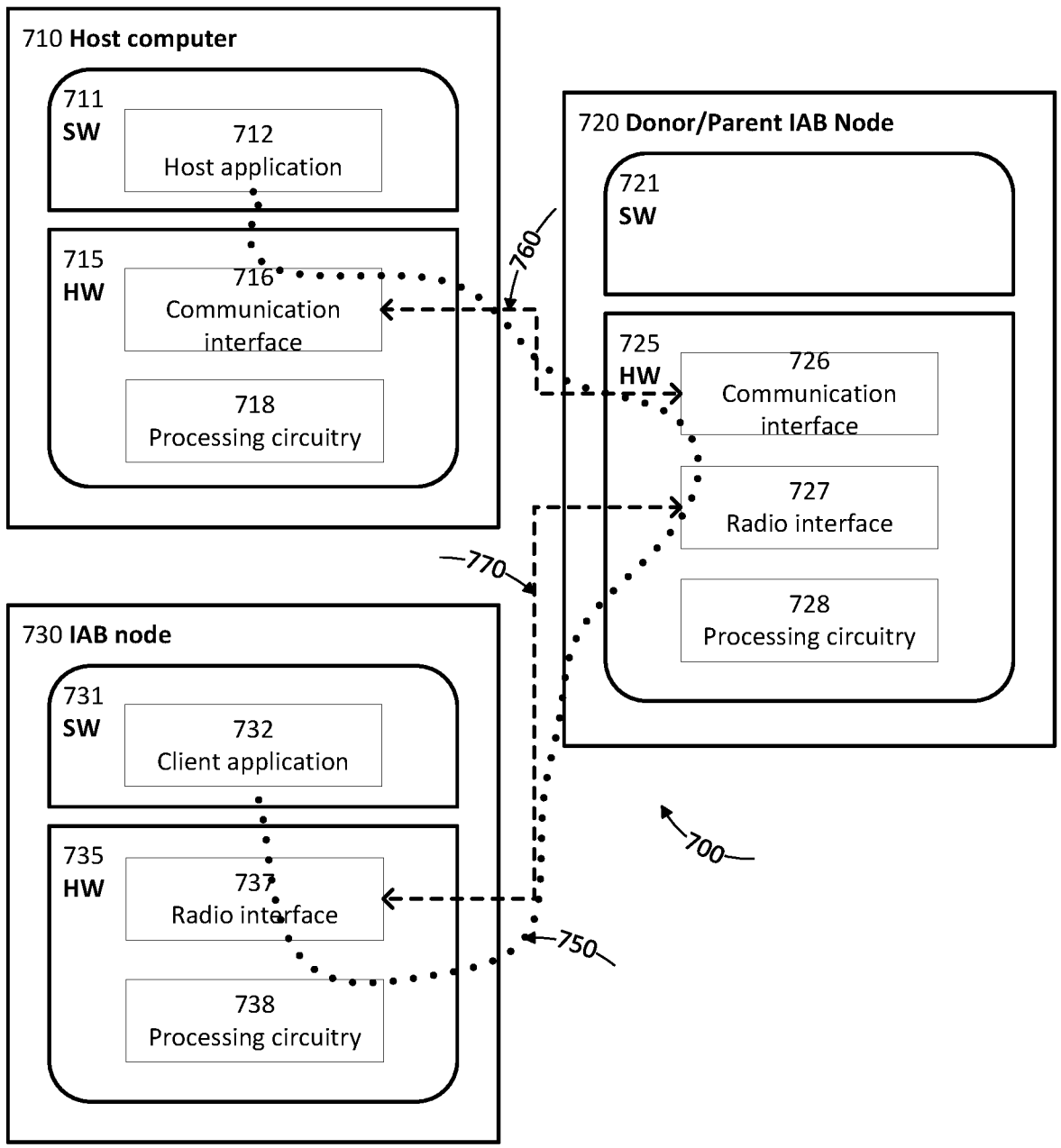
FIG. 21 is a generalized block diagram of a host computer communicating via one or more IAB nodes over a partially wireless connection.

It is noted that the host computer 710, base station 720 and UE 730 illustrated in FIG. 21 may be identical to the host computer 630, one of the base stations 612*a*, 612*b*, 612*c* and one of the UEs 691, 692 of FIG. 20, respectively. This is to say, the inner workings of these entities may be as shown in FIG. 21 and independently, the surrounding network topology may be that of FIG. 20.

In FIG. 21, the OTT connection 750 has been drawn abstractly to illustrate the communication between the host computer 710 and the use equipment 730 via the base station 720, without explicit reference to any intermediary devices and the precise routing of messages via these devices. Network infrastructure may determine the routing, which it may be configured to hide from the UE 730 or from the service provider operating the host computer 710, or both. While the OTT connection 750 is active, the network infrastructure may further take decisions by which it dynamically changes the routing (e.g., on the basis of load balancing consideration or reconfiguration of the network).

The wireless connection 770 between the UE 730 and the base station 720 is in accordance with the teachings of the embodiments described throughout this disclosure. One or more of the various embodiments improve the performance of OTT services provided to the UE 730 using the OTT connection 750, in which the wireless connection 770 forms the last segment. More precisely, the teachings of these embodiments may improve the radio network security and integrity and thereby provide benefits such as simplified security procedures for accessing OTT services. In addition a number of the embodiments disclosed herein may be applied via the host computer 710, for example the provision of timing difference information and checking UE access capabilities for provision of UE based provisioning "as-a-service". OTT features which rely on positioning may receive more accurate positioning information directly from the wireless device rather than via the location server (UE assisted positioning). This improves the latency for such OTT services and potentially reduces the number of positioning measurements a UE would need to perform, reducing the power consumption and processing load.

A measurement procedure may be provided for the purpose of monitoring data rate, latency and other factors on which the one or more embodiments improve. There may further be an optional network functionality for reconfiguring the OTT connection 750 between the host computer 710 and UE 730, in response to variations in the measurement results. The measurement procedure and/or the network functionality for reconfiguring the OTT connection 750 may be implemented in the software 711 of the host computer 710 or in the software 731 of the UE 730, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 711, 731 may compute or estimate the monitored quantities. The reconfiguring of the OTT connection 750 may include message format, retransmission settings, preferred routing etc.; the reconfiguring need not affect the base station 720, and it may be unknown or imperceptible to the base station 720. Such procedures and functionalities may be known and practiced in the art. In certain embodiments, measurements may involve proprietary UE signaling facilitating the host computer's 710 measurements of throughput, propagation times, latency and the like. The measurements may be implemented in that the software 711, 731 causes messages to be transmitted, in particular empty or 'dummy' messages, using the OTT connection 750 while it monitors propagation times, errors etc.

Figure 22:
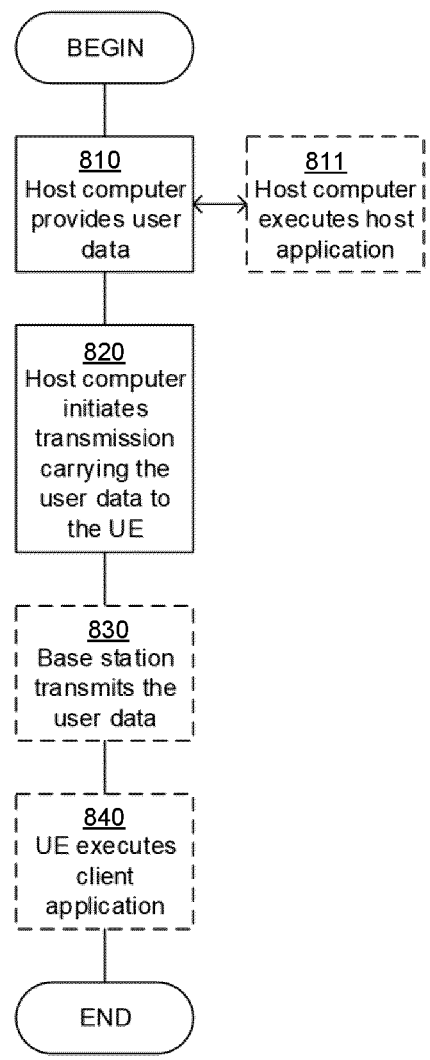
FIGS. 22 to 25 are flowcharts illustrating methods implemented in a communication system including a host computer, IAB nodes and a user equipment.

FIG. 22 is a flowchart illustrating a method implemented in a communication system, in accordance with one embodiment. The communication system includes a host computer, a base station and a wireless device or UE which may be those described with reference to FIGS. 20 and 21. For simplicity of the present disclosure, only drawing references to FIG. 22 will be included in this section. In a first step 810 of the method, the host computer provides user data. In an optional substep 811 of the first step 810, the host computer provides the user data by executing a host application. In a second step 820, the host computer initiates a transmission carrying the user data to the UE. In an optional third step 830, the base station transmits to the UE the user data which was carried in the transmission that the host computer initiated, in accordance with the teachings of the embodiments described throughout this disclosure. In an optional fourth step 840, the UE executes a client application associated with the host application executed by the host computer.

Figure 23:
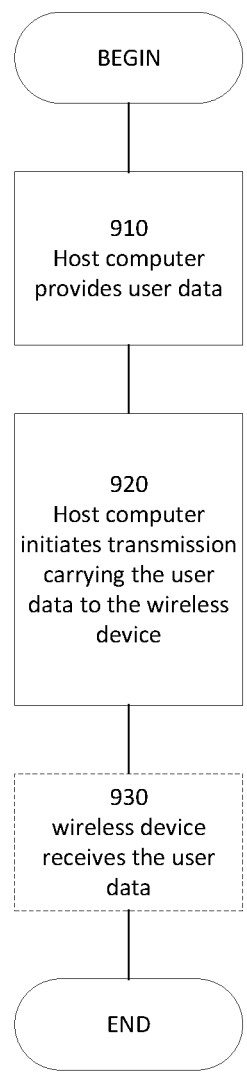

FIG. 23 is a flowchart illustrating a method implemented in a communication system, in accordance with one embodiment. The communication system includes a host computer, a base station and a wireless device or UE which may be those described with reference to FIGS. 20 and 21. For simplicity of the present disclosure, only drawing references to FIG. 23 will be included in this section. In a first step 910 of the method, the host computer provides user data. In an optional substep (not shown) the host computer provides the user data by executing a host application. In a second step 920, the host computer initiates a transmission carrying the user data to the UE. The transmission may pass via the base station, in accordance with the teachings of the embodiments described throughout this disclosure. In an optional third step 930, the UE receives the user data carried in the transmission.

Figure 24:
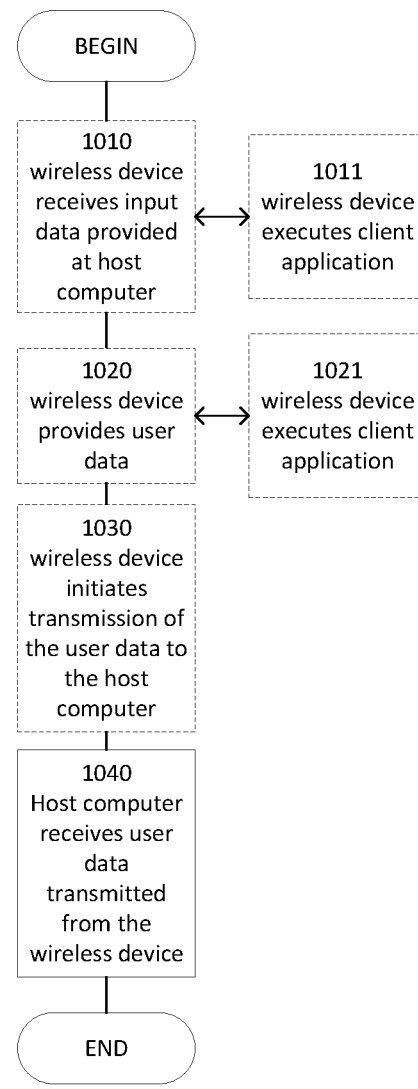

FIG. 24 is a flowchart illustrating a method implemented in a communication system, in accordance with one embodiment. The communication system includes a host computer, a base station and a wireless device or UE which may be those described with reference to FIGS. 20 and 21. For simplicity of the present disclosure, only drawing references to FIG. 24 will be included in this section. In an optional first step 1010 of the method, the UE receives input data provided by the host computer. Additionally or alternatively, in an optional second step 1020, the UE provides user data. In an optional substep 1021 of the second step 1020, the UE provides the user data by executing a client application. In a further optional substep 1011 of the first step 1010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1030, transmission of the user data to the host computer. In a fourth step 1040 of the method, the host computer receives the user data transmitted from the UE, in accordance with the teachings of the embodiments described throughout this disclosure.

Figure 25:
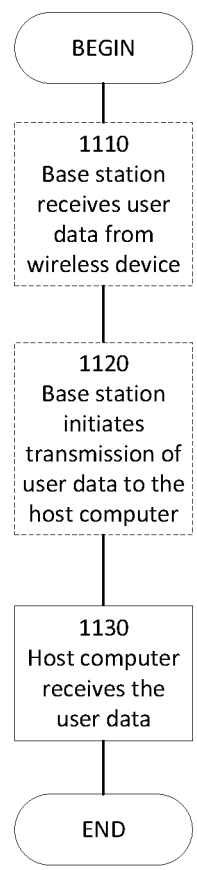

FIG. 25 is a flowchart illustrating a method implemented in a communication system, in accordance with one embodiment. The communication system includes a host computer, a base station and a wireless device or UE which may be those described with reference to FIGS. 20 and 21. For simplicity of the present disclosure, only drawing references to FIG. 25 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

It should be noted that the above-mentioned examples illustrate rather than limit the invention, and that those skilled in the art will be able to design many alternative embodiments without departing from the scope of the appended embodiments. The word "comprising" does not exclude the presence of elements or steps other than those listed in a embodiment, "a" or "an" does not exclude a plurality, and a single processor or other unit may fulfil the functions of several units recited in the embodiments. Any reference signs in the embodiments shall not be construed so as to limit their scope.

Example Embodiments

1. A method, performed by an integrated access and backhaul, IAB, node, the IAB node comprising a mobile termination, MT, and a radio interface distributed unit, DU, wherein the MT terminates the radio interface layers of a backhaul interface towards a parent node and the DU interfaces user equipment, UE, and/or MTs of another IAB node, the method comprising:
 determining one or more timing offsets for a time resource, the offsets being in relation to/corresponding to an MT and/or a DU resource of the IAB node,
 providing to the parent IAB node, information related to the one or more timing offsets of the IAB node.

2. The method of embodiment 1, wherein the one or more timing offsets is in relation to/corresponding to a frame and/or slot timing of the MT and/or DU resource.

3. The method of embodiment 1 or embodiment 2, wherein the one or more timing offsets comprises at least one of the following:
 an offset between DU downlink transmission and MT downlink reception;
 an offset between DU downlink transmission and MT uplink transmission;
 an offset between DU uplink reception and MT downlink reception; and
 an offset between DU uplink reception and MT uplink transmission.

4. The method of any one of embodiments 1 to 3, wherein the information related to the one or more timing offsets corresponds to a timing difference between one of the DU resources or one of the MT resources and any one of the other DU or MT resources.

5. The method of embodiment 4, wherein the one or more timing offsets comprises a set of 3 offset timings, wherein the set comprises a timing for each of an M(T), an M(R), a D(T) and a D(R) timing, wherein M(T) corresponds to the MT uplink transmission timing; M(R) corresponds to MT downlink reception timing; D(T) corresponds to DU downlink transmission timing; and D(R) corresponds to DU uplink reception timing.

6. The method of embodiment 5, wherein the set comprises one of:
 $T_{M(T)-M(R)}$, $T_{D(T)-M(R)}$ and $T_{D(R)-M(R)}$; or
 $T_{M(T)-M(R)}$, $T_{D(T)-M(R)}$ and $T_{D(R)-M(T)}$; or
 $T_{M(T)-M(R)}$, $T_{D(T)-M(R)}$ and $T_{D(R)-D(T)}$; or
 $T_{M(T)-M(R)}$, $T_{D(R)-M(R)}$ and $T_{D(T)-M(T)}$; or
 $T_{M(T)-M(R)}$, $T_{D(R)-M(R)}$ and $T_{D(R)-D(T)}$; or
 $T_{M(T)-M(R)}$, $T_{D(T)-M(T)}$ and $T_{D(R)-M(T)}$; or
 $T_{M(T)-M(R)}$, $T_{D(T)-M(T)}$ and $T_{D(R)-D(T)}$; or
 $T_{M(T)-M(R)}$, $T_{D(R)-M(T)}$ and $T_{D(R)-D(T)}$; or
 $T_{D(T)-M(R)}$, $T_{D(R)-M(R)}$ and $T_{D(T)-M(T)}$; or
 $T_{D(T)-M(R)}$, $T_{D(R)-M(R)}$ and $T_{D(R)-M(T)}$; or
 $T_{D(T)-M(R)}$, $T_{D(T)-M(T)}$ and $T_{D(R)-M(T)}$; or
 $T_{D(T)-M(R)}$, $T_{D(T)-M(T)}$ and $T_{D(R)-D(T)}$; or
 $T_{D(T)-M(R)}$, $T_{D(R)-M(T)}$ and $T_{D(R)-D(T)}$; or
 $T_{D(R)-M(R)}$, $T_{D(T)-M(T)}$ and $T_{D(R)-M(T)}$; or
 $T_{D(R)-M(R)}$, $T_{D(T)-M(T)}$ and $T_{D(R)-D(T)}$; or
 $T_{D(R)-M(R)}$, $T_{D(R)-M(T)}$ and $T_{D(R)-D(T)}$.

7. The method of any one of embodiments 1 to 3, wherein each of the one or more timing offsets corresponds to a timing difference, ΔT, between one of the DU resources or one of the MT resources and a reference time.

8. The method of embodiment 7, wherein the one or more timing offsets comprise:
 $\Delta T_{M(T)}$, $\Delta T_{M(R)}$, $\Delta T_{D(T)}$ and $\Delta T_{D(R)}$, wherein M(T) corresponds to the MT uplink transmission timing; M(R) corresponds to MT downlink reception timing; D(T) corresponds to DU downlink transmission timing; and D(R) corresponds to DU uplink reception timing.

9. The method of any one of embodiments 1 to 8, wherein the one or more timing offsets have orthogonal frequency-division multiplexing, OFDM, symbol granularity.

10. A method performed by a parent node, for scheduling downlink and uplink transmissions between the parent node and an integrated access and backhaul, IAB, node, the method comprising:
 obtaining information related to one or more timing offsets between mobile termination, MT, resources and distributed unit, DU, resources of the IAB node;
 scheduling uplink and/or downlink transmissions at the IAB node based on the one or more timing offsets.

11. The method of embodiment 10, wherein the one or more timing offsets is in relation to/corresponding to a frame and/or slot timing of the MT and/or DU resource.

12. The method of embodiment 10 or 11, wherein the one or more timing offsets comprise any one of the following:
 offset between DU downlink transmission and MT downlink reception;
 offset between DU downlink transmission and MT uplink transmission;
 offset between DU uplink reception and MT downlink reception; and
 offset between DU uplink reception and MT uplink transmission.

13. The method of any one of embodiments 10 to 12, wherein the information related to the one or more timing offsets corresponds to a timing difference between one of the DU resources or one of the MT resources and any one of the other DU or MT resources.

14. The method of embodiment 13, further comprising the parent node determining the one or more timing offsets between the MT resource timings and the DU resource timings of the IAB node based, at least partly, on the obtained information related to the one or more timing offsets.

15. The method of embodiment 14, wherein the one or more offsets comprises three timing difference values, each value corresponding to the timing difference between a different one of the DU resource timing or one of the MT resource timing and any one of the other DU or MT resource timings, and based on the three timing difference values, the parent node determining:
 the offset between DU downlink transmission and MT downlink reception;
 the offset between DU downlink transmission and MT uplink transmission;
 the offset between DU uplink reception and MT downlink reception; and
 the offset between DU uplink reception and MT uplink transmission.

16. The method of embodiment 14, wherein the one or more timing offsets comprises a set of 3 offset timings, wherein the set comprises a timing for each of an M(T), an M(R), a D(T) and a D(R) timing, wherein M(T) corresponds to the MT uplink transmission timing; M(R) corresponds to MT downlink reception timing; D(T) corresponds to DU downlink transmission timing; and D(R) corresponds to DU uplink reception timing.

17. The method of embodiment 16, wherein the set comprises one of:

$T_{M(T)-M(R)}$, $T_{D(T)-M(R)}$ and $T_{D(R)-M(R)}$; or
$T_{M(T)-M(R)}$, $T_{D(T)-M(R)}$ and $T_{D(R)-M(T)}$; or
$T_{M(T)-M(R)}$, $T_{D(T)-M(R)}$ and $T_{D(R)-D(T)}$; or
$T_{M(T)-M(R)}$, $T_{D(R)-M(R)}$ and $T_{D(T)-M(T)}$; or
$T_{M(T)-M(R)}$, $T_{D(R)-M(R)}$ and $T_{D(R)-D(T)}$; or
$T_{M(T)-M(R)}$, $T_{D(T)-M(T)}$ and $T_{D(R)-M(T)}$; or
$T_{M(T)-M(R)}$, $T_{D(T)-M(T)}$ and $T_{D(R)-D(T)}$; or
$T_{M(T)-M(R)}$, $T_{D(R)-M(T)}$ and $T_{D(R)-D(T)}$; or
$T_{D(T)-M(R)}$, $T_{D(R)-M(R)}$ and $T_{D(T)-M(T)}$; or
$T_{D(T)-M(R)}$, $T_{D(R)-M(R)}$ and $T_{D(R)-M(T)}$; or
$T_{D(T)-M(R)}$, $T_{D(T)-M(T)}$ and $T_{D(R)-M(T)}$; or
$T_{D(T)-M(R)}$, $T_{D(T)-M(T)}$ and $T_{D(R)-D(T)}$; or
$T_{D(T)-M(R)}$, $T_{D(R)-M(T)}$ and $T_{D(R)-D(T)}$; or
$T_{D(R)-M(R)}$, $T_{D(T)-M(T)}$ and $T_{D(R)-M(T)}$; or
$T_{D(R)-M(R)}$, $T_{D(T)-M(T)}$ and $T_{D(R)-D(T)}$; or
$T_{D(R)-M(R)}$, $T_{D(R)-M(T)}$ and $T_{D(R)-D(T)}$.

18. The method according to embodiment 17, wherein
the offset between DU downlink transmission and MT downlink reception is denoted as $T_{D(T)-M(R)}$;
the offset between DU downlink transmission and MT uplink transmission is denoted as $T_{D(T)-M(T)}$;
the offset between DU uplink reception and MT downlink reception is denoted as $T_{D(R)-M(R)}$; and
the offset between DU uplink reception and MT uplink transmission is denoted as $T_{D(R)-M(T)}$ and:

when the information corresponds to $T_{M(T)-M(R)}$, $T_{D(T)-M(R)}$ and $T_{D(R)-M(R)}$, the parent node determines the timing offsets as $T_{D(T)-M(R)}=T_{D(T)-M(R)}$, $T_{D(T)-M(T)}=T_{D(T)-M(R)}-T_{M(T)-M(R)}$, $T_{D(R)-M(R)}-T_{D(R)-M(R)}$ and $T_{D(R)-M(T)}=T_{D(R)-M(R)}-T_{M(T)-M(R)}$; or when the information corresponds to $T_{M(T)-M(R)}$, $T_{D(T)-M(R)}$ and $T_{D(R)-M(T)}$, the parent node determines the timing offsets as $T_{D(T)-M(R)}=T_{D(T)-M(R)}$, $T_{D(T)-M(T)}=T_{D(T)-M(R)}-T_{M(T)-M(R)}$, $T_{D(R)-M(R)}-T_{D(R)-M(T)}+T_{M(T)-M(R)}$ and $T_{D(R)-M(T)}=T_{D(R)-M(T)}$; or when the information corresponds to $T_{M(T)-M(R)}$, $T_{D(T)-M(R)}$ and $T_{D(R)-D(T)}$, the parent node determines the timing offsets as $T_{D(T)-M(R)}=T_{D(T)-M(R)}$, $T_{D(T)-M(T)}=T_{D(T)-M(R)}-T_{M(T)-M(R)}$, $T_{D(R)-M(R)}-T_{D(R)-D(T)}+T_{D(T)-M(R)}$ and $T_{D(R)-M(T)}=T_{D(R)-D(T)}+T_{D(T)-M(R)}-T_{M(T)-M(R)}$; or when the information corresponds to $T_{M(T)-M(R)}$, $T_{D(R)-M(R)}$ and $T_{D(T)-M(T)}$, the parent node determines the timing offsets as $T_{D(T)-M(R)}=T_{D(T)-M(T)}+T_{M(T)-M(R)}$, $T_{D(T)-M(T)}=T_{D(T)-M(T)}$, $T_{D(R)-M(R)}-T_{D(R)-M(R)}$ and $T_{D(R)-M(T)}=T_{D(R)-M(R)}-T_{M(T)-M(R)}$; or when the information corresponds to $T_{M(T)-M(R)}$, $T_{D(R)-M(R)}$ and $T_{D(R)-D(T)}$, the parent node determines the timing offsets as $T_{D(T)-M(R)}=-T_{D(R)-D(T)}+T_{D(R)-M(R)}$, $T_{D(T)-M(T)}=-T_{D(R)-D(T)}+T_{D(R)-M(R)}-T_{M(T)-M(R)}$, $T_{D(R)-M(R)}=T_{D(R)-M(R)}$ and $T_{D(R)-M(T)}=T_{D(R)-M(R)}-T_{M(T)-M(R)}$; or when the information corresponds to $T_{M(T)-M(R)}$, $T_{D(T)-M(T)}$ and $T_{D(R)-M(T)}$, the parent node determines the timing offsets as $T_{D(T)-M(R)}=T_{D(T)-M(T)}+T_{M(T)-M(R)}$, $T_{D(T)-M(T)}=T_{D(T)-M(T)}$, $T_{D(R)-M(R)}=T_{D(R)-M(T)}+T_{M(T)-M(R)}$ and $T_{D(R)-M(T)}=T_{D(R)-M(T)}$; or when the information corresponds to $T_{M(T)-M(R)}$, $T_{D(T)-M(T)}$ and $T_{D(R)-D(T)}$, the parent node determines the timing offsets as $T_{D(T)-M(R)}=-T_{D(R)-D(T)}+T_{D(R)-M(T)}+T_{M(T)-M(R)}$, $T_{D(T)-M(T)}=-T_{D(R)-D(T)}+T_{D(R)-M(T)}$, $T_{D(R)-M(R)}=T_{D(R)-M(T)}+T_{M(T)-M(R)}$ and $T_{D(R)-M(T)}=T_{D(R)-M(T)}$; or when the information corresponds to $T_{D(T)-M(R)}$, $T_{D(R)-M(R)}$ and $T_{D(T)-M(T)}$, the parent node determines the timing offsets as $T_{D(T)-M(R)}=T_{D(T)-M(R)}$, $T_{D(T)-M(T)}=T_{D(T)-M(T)}$, $T_{D(R)-M(R)}=T_{D(R)-D(T)}+T_{D(T)-M(T)}$ and $T_{D(R)-M(T)}=T_{D(R)-D(T)}+T_{D(T)-M(T)}$; or when the information corresponds to $T_{D(T)-M(R)}$, $T_{D(R)-M(R)}$ and $T_{D(T)-M(T)}$, the parent node determines the timing offsets as $T_{D(T)-M(R)}=-T_{D(R)-D(T)}+T_{D(R)-M(T)}+T_{M(T)-M(R)}$, $T_{D(T)-M(T)}=-T_{D(R)-D(T)}+T_{D(R)-M(T)}$, $T_{D(R)-M(R)}=T_{D(R)-M(T)}+T_{M(T)-M(R)}$ and $T_{D(R)-M(T)}=T_{D(R)-M(T)}$; or when the information corresponds to $T_{D(T)-M(R)}$, $T_{D(R)-M(R)}$ and $T_{D(T)-M(T)}$, the parent node determines the timing offsets as $T_{D(T)-M(R)}=T_{D(T)-M(R)}$, $T_{D(T)-M(T)}=T_{D(T)-M(T)}$, $T_{D(R)-M(R)}=T_{D(R)-M(R)}$ and $T_{D(R)-M(T)}=T_{D(R)-M(R)}-T_{D(T)-M(R)}+T_{D(T)-M(T)}$; or when the information corresponds to $T_{D(T)-M(R)}$, $T_{D(R)-M(R)}$ and $T_{D(R)-M(T)}$, the parent node determines the timing offsets as $T_{D(T)-M(R)}=T_{D(T)-M(R)}$, $T_{D(T)-M(T)}=T_{D(T)-M(R)}-T_{D(R)-M(R)}+T_{D(R)-M(T)}$, $T_{D(R)-M(R)}=T_{D(R)-M(R)}$ and $T_{D(R)-M(T)}=T_{D(R)-M(T)}$; or when the information corresponds to $T_{D(T)-M(R)}$, $T_{D(T)-M(T)}$ and $T_{D(R)-M(T)}$, the parent node determines the timing offsets as $T_{D(T)-M(R)}=T_{D(T)-M(R)}$, $T_{D(T)-M(T)}=T_{D(T)-M(T)}$, $T_{D(R)-M(R)}=T_{D(R)-D(T)}+T_{D(T)-M(R)}$ and $T_{D(R)-M(T)}=T_{D(R)-D(T)}+T_{D(T)-M(T)}$; or when the information corresponds to $T_{D(T)-M(R)}$, $T_{D(T)-M(T)}$ and $T_{D(R)-D(T)}$, the parent node determines the timing offsets as $T_{D(T)-M(R)}=T_{D(T)-M(R)}$, $T_{D(T)-M(T)}=T_{D(T)-M(T)}-T_{D(R)-M(T)}+T_{D(R)-M(R)}$, $T_{D(R)-M(T)}=T_{D(T)-M(T)}$, $T_{D(R)-M(R)}=T_{D(R)-M(R)}$ and $T_{D(R)-M(T)}=T_{D(R)-M(T)}$; or when the information corresponds to $T_{D(T)-M(R)}$, $T_{D(R)-M(T)}$ and $T_{D(R)-D(T)}$, the parent node determines the timing offsets as $T_{D(T)-M(R)}=-T_{D(R)-D(T)}+T_{D(R)-M(R)}$, $T_{D(T)-M(T)}=T_{D(T)-M(T)}$, $T_{D(R)-M(R)}=T_{D(R)-M(R)}$ and $T_{D(R)-M(T)}=T_{D(R)-D(T)}+T_{D(T)-M(T)}$; or when the information corresponds to $T_{D(R)-M(R)}$, $T_{D(T)-M(T)}$ and $T_{D(R)-D(T)}$, the parent node determines the timing offsets as $T_{D(T)-M(R)}=-T_{D(R)-D(T)}+T_{D(R)-M(R)}$, $T_{D(T)-M(T)}=T_{D(R)-D(T)}+T_{D(R)-M(T)}$, $T_{D(R)-M(R)}=T_{D(R)-M(R)}$ and $T_{D(R)-M(T)}=T_{D(R)-M(T)}$.

19. The method of any one of embodiments 10 to 12, wherein the one or more timing offsets corresponds to a timing difference, $\Delta T$, between one of the DU frame and/or slot timings or one of the MT frame and/or slot timings and a reference time.

20. The method of embodiment 19, wherein the one or more timing offsets corresponds to:

$\Delta T_{M(T)}$, $\Delta T_{M(R)}$, $\Delta T_{D(T)}$ and $\Delta T_{D(R)}$, wherein M(T) corresponds to the MT uplink transmission frame and/or slot timing; M(R) corresponds to MT downlink reception; D(T) corresponds to DU downlink transmission; and D(R) corresponds to DU uplink reception, and the parent node determines:

the offset between DU downlink transmission and MT downlink reception, denoted as $T_{D(T)-M(R)}=\Delta T_{D(T)}-\Delta T_{M(R)}$;

the offset between DU downlink transmission and MT uplink transmission is denoted as $T_{D(T)-M(T)}=\Delta T_{D(T)}-\Delta T_{M(T)}$;

the offset between DU uplink reception and MT downlink reception is denoted as $T_{D(R)-M(R)}=\Delta T_{D(R)}-\Delta T_{M(R)}$; and the offset between DU uplink reception and MT uplink transmission is denoted as $T_{D(R)-M(T)}=\Delta T_{D(R)}-\Delta T_{M(T)}$.

21. The method of any one of embodiments 10 to 20, wherein the one or more timing offsets have orthogonal frequency-division multiplexing, OFDM, symbol granularity.

22. The method of any one of embodiments 10 to 21, wherein the parent node adds one symbol to each determined timing offset.

23. The method of any one of embodiments 10 to 22, wherein the information is obtained by the parent node via signalling from the IAB node.

24. The method of any one of embodiments 10 to 23, wherein the parent node comprises a donor IAB node.

25. An integrated access and backhaul, IAB, node comprising a mobile termination, MT, and a radio interface distributed unit, DU, wherein the MT terminates the radio interface layers of a backhaul interface towards a parent node and the DU interfaces user equipment, UE, and/or MTs of a another IAB node, the IAB configured to:
   determine one or more timing offsets for a time resource, the offsets being in relation to/corresponding to an MT and/or a DU resource of the IAB node,
   provide to the parent IAB node, information related to the one or more timing offsets of the IAB node.

26. The IAB of embodiment 25, wherein the one or more timing offsets is in relation to/corresponding to a frame and/or slot timing of the MT and/or DU resource.

27. The IAB of embodiment 25 or embodiment 26, wherein the one or more timing offsets comprises at least one of the following:
   an offset between DU downlink transmission and MT downlink reception;
   an offset between DU downlink transmission and MT uplink transmission;
   an offset between DU uplink reception and MT downlink reception; and
   an offset between DU uplink reception and MT uplink transmission.

28. The IAB of any one of embodiments 25 to 27, wherein the information related to the one or more timing offsets corresponds to a timing difference between one of the DU resources or one of the MT resources and any one of the other DU or MT resources.

29. The IAB of embodiment 28, wherein the one or more timing offsets comprises a set of 3 offset timings, wherein the set comprises a timing for each of an M(T), an M(R), a D(T) and a D(R) timing, wherein M(T) corresponds to the MT uplink transmission timing; M(R) corresponds to MT downlink reception timing; D(T) corresponds to DU downlink transmission timing; and D(R) corresponds to DU uplink reception timing.

30. The IAB of embodiment 29, wherein the set comprises one of:
   $T_{M(T)-M(R)}$, $T_{D(T)-M(R)}$ and $T_{D(R)-M(R)}$; or
   $T_{M(T)-M(R)}$, $T_{D(T)-M(R)}$ and $T_{D(R)-M(T)}$; or
   $T_{M(T)-M(R)}$, $T_{D(T)-M(R)}$ and $T_{D(R)-D(T)}$; or
   $T_{M(T)-M(R)}$, $T_{D(R)-M(R)}$ and $T_{D(T)-M(T)}$; or
   $T_{M(T)-M(R)}$, $T_{D(R)-M(R)}$ and $T_{D(R)-D(T)}$; or
   $T_{M(T)-M(R)}$, $T_{D(T)-M(T)}$ and $T_{D(R)-M(T)}$; or
   $T_{M(T)-M(R)}$, $T_{D(T)-M(T)}$ and $T_{D(R)-D(T)}$; or
   $T_{M(T)-M(R)}$, $T_{D(R)-M(T)}$ and $T_{D(R)-D(T)}$; or
   $T_{D(T)-M(R)}$, $T_{D(R)-M(R)}$ and $T_{D(T)-M(T)}$; or
   $T_{D(T)-M(R)}$, $T_{D(R)-M(R)}$ and $T_{D(R)-M(T)}$; or
   $T_{D(T)-M(R)}$, $T_{D(T)-M(T)}$ and $T_{D(R)-M(T)}$; or
   $T_{D(T)-M(R)}$, $T_{D(T)-M(T)}$ and $T_{D(R)-D(T)}$; or
   $T_{D(T)-M(R)}$, $T_{D(R)-M(T)}$ and $T_{D(R)-D(T)}$; or
   $T_{D(R)-M(R)}$, $T_{D(T)-M(T)}$ and $T_{D(R)-M(T)}$; or
   $T_{D(R)-M(R)}$, $T_{D(T)-M(T)}$ and $T_{D(R)-D(T)}$; or
   $T_{D(R)-M(R)}$, $T_{D(R)-M(T)}$ and $T_{D(R)-D(T)}$.

31. The IAB of any one of embodiments 25 to 27, wherein each of the one or more timing offsets corresponds to a timing difference, ΔT, between one of the DU resources or one of the MT resources and a reference time.

32. The IAB of embodiment 31, wherein the one or more timing offsets comprise:
   $\Delta T_{M(T)}$, $\Delta T_{M(R)}$, $\Delta T_{D(T)}$ and $\Delta T_{D(R)}$, wherein
   M(T) corresponds to the MT uplink transmission timing; M(R) corresponds to MT downlink reception timing; D(T) corresponds to DU downlink transmission timing; and D(R) corresponds to DU uplink reception timing.

33. The IAB of any one of embodiments 25 to 32, wherein the one or more timing offsets have orthogonal frequency-division multiplexing, OFDM, symbol granularity.

34. A parent integrated access and backhaul IAB, node, configured to:
   obtain information related to one or more timing offsets between mobile termination, MT, resources and distributed unit, DU, resources of a child IAB node;
   schedule uplink and/or downlink transmissions at the child IAB node based on the one or more timing offsets.

35. The parent IAB node of embodiment 34, wherein the one or more timing offsets is in relation to/corresponding to a frame and/or slot timing of the MT and/or DU resource.

36. The parent IAB node of embodiment 34 or 35, wherein the one or more timing offsets comprise any one of the following:
   offset between DU downlink transmission and MT downlink reception;
   offset between DU downlink transmission and MT uplink transmission;
   offset between DU uplink reception and MT downlink reception; and
   offset between DU uplink reception and MT uplink transmission.

37. The parent IAB node of any one of embodiments 34 to 36, wherein the information related to the one or more timing offsets corresponds to a timing difference between one of the DU resources or one of the MT resources and any one of the other DU or MT resources.

38. The parent IAB node of embodiment 37, further configured to:
   determine the one or more timing offsets between the MT resource timings and the DU resource timings of the IAB node based, at least partly, on the obtained information related to the one or more timing offsets.

39. The parent IAB node of embodiment 38, wherein the one or more offsets comprises three timing difference values, each value corresponding to the timing difference between a different one of the DU resource timing or one of the MT resource timing and any one of the other DU or MT resource timings, and based on the three timing difference values, the parent node determining:
   the offset between DU downlink transmission and MT downlink reception;
   the offset between DU downlink transmission and MT uplink transmission;
   the offset between DU uplink reception and MT downlink reception; and
   the offset between DU uplink reception and MT uplink transmission.

40. The parent IAB node of embodiment 39, wherein the one or more timing offsets comprises a set of 3 offset timings, wherein the set comprises a timing for each of an M(T), an M(R), a D(T) and a D(R) timing, wherein M(T) corresponds to the MT uplink transmission timing; M(R)

corresponds to MT downlink reception timing; D(T) corresponds to DU downlink transmission timing; and D(R) corresponds to DU uplink reception timing.

41. The parent IAB node of embodiment 40, wherein the set comprises one of:

$T_{M(T)-M(R)}$, $T_{D(T)-M(R)}$ and $T_{D(R)-M(R)}$; or
$T_{M(T)-M(R)}$, $T_{D(T)-M(R)}$ and $T_{D(R)-M(T)}$; or
$T_{M(T)-M(R)}$, $T_{D(T)-M(R)}$ and $T_{D(R)-D(T)}$; or
$T_{M(T)-M(R)}$, $T_{D(R)-M(R)}$ and $T_{D(T)-M(T)}$; or
$T_{M(T)-M(R)}$, $T_{D(R)-M(R)}$ and $T_{D(R)-D(T)}$; or
$T_{M(T)-M(R)}$, $T_{D(T)-M(T)}$ and $T_{D(R)-M(T)}$; or
$T_{M(T)-M(R)}$, $T_{D(T)-M(T)}$ and $T_{D(R)-D(T)}$; or
$T_{M(T)-M(R)}$, $T_{D(R)-M(T)}$ and $T_{D(R)-D(T)}$; or
$T_{D(T)-M(R)}$, $T_{D(R)-M(R)}$ and $T_{D(T)-M(T)}$; or
$T_{D(T)-M(R)}$, $T_{D(R)-M(R)}$ and $T_{D(R)-M(T)}$; or
$T_{D(T)-M(R)}$, $T_{D(T)-M(T)}$ and $T_{D(R)-M(T)}$; or
$T_{D(T)-M(R)}$, $T_{D(T)-M(T)}$ and $T_{D(R)-D(T)}$; or
$T_{D(T)-M(R)}$, $T_{D(R)-M(T)}$ and $T_{D(R)-D(T)}$; or
$T_{D(R)-M(R)}$, $T_{D(T)-M(T)}$ and $T_{D(R)-M(T)}$; or
$T_{D(R)-M(R)}$, $T_{D(T)-M(T)}$ and $T_{D(R)-D(T)}$; or
$T_{D(R)-M(R)}$, $T_{D(R)-M(T)}$ and $T_{D(R)-D(T)}$.

42. The parent IAB node according to embodiment 41, wherein the offset between DU downlink transmission and MT downlink reception is denoted as $T_{D(T)-M(R)}$;

the offset between DU downlink transmission and MT uplink transmission is denoted as $T_{D(T)-M(T)}$;

the offset between DU uplink reception and MT downlink reception is denoted as $T_{D(R)-M(R)}$; and the offset between DU uplink reception and MT uplink transmission is denoted as $T_{D(R)-M(T)}$ and:

when the information corresponds to $T_{M(T)-M(R)}$, $T_{D(T)-M(R)}$ and $T_{D(R)-M(R)}$, the parent node determines the timing offsets as $T_{D(T)-M(R)}=T_{D(T)-M(R)}$, $T_{D(T)-M(T)}=T_{D(T)-M(R)}-T_{M(T)-M(R)}$, $T_{D(R)-M(R)}=T_{D(R)-M(R)}$ and $T_{D(R)-M(T)}=T_{D(R)-M(R)}-T_{M(T)-M(R)}$; or when the information corresponds to $T_{M(T)-M(R)}$, $T_{D(T)-M(R)}$ and $T_{D(R)-M(T)}$, the parent node determines the timing offsets as $T_{D(T)-M(R)}=T_{D(T)-M(R)}$, $T_{D(T)-M(T)}=T_{D(T)-M(R)}-T_{M(T)-M(R)}$, $T_{D(R)-M(R)}=T_{D(R)-M(T)}+T_{M(T)-M(R)}$ and $T_{D(R)-M(T)}=T_{D(R)-M(T)}$; or when the information corresponds to $T_{M(T)-M(R)}$, $T_{D(T)-M(R)}$ and $T_{D(R)-D(T)}$, the parent node determines the timing offsets as $T_{D(T)-M(R)}=T_{D(T)-M(R)}$, $T_{D(T)-M(T)}=T_{D(T)-M(R)}-T_{M(T)-M(R)}$, $T_{D(R)-M(R)}=T_{D(R)-D(T)}+T_{D(T)-M(R)}$ and $T_{D(R)-M(T)}=T_{D(R)-D(T)}+T_{D(T)-M(R)}-T_{M(T)-M(R)}$; or when the information corresponds to $T_{M(T)-M(R)}$, $T_{D(R)-M(R)}$ and $T_{D(T)-M(T)}$, the parent node determines the timing offsets as $T_{D(T)-M(R)}=T_{D(T)-M(T)}+T_{M(T)-M(R)}$, $T_{D(T)-M(T)}=T_{D(T)-M(T)}$, $T_{D(R)-M(R)}=T_{D(R)-M(R)}$ and $T_{D(R)-M(T)}=T_{D(R)-M(R)}-T_{M(T)-M(R)}$; or when the information corresponds to $T_{M(T)-M(R)}$, $T_{D(R)-M(R)}$ and $T_{D(R)-D(T)}$, the parent node determines the timing offsets as $T_{D(T)-M(R)}=-T_{D(R)-D(T)}+T_{D(R)-M(R)}$, $T_{D(T)-M(T)}=-T_{D(R)-D(T)}+T_{D(R)-M(R)}-T_{M(T)-M(R)}$, $T_{D(R)-M(R)}=T_{D(R)-M(R)}$ and $T_{D(R)-M(T)}=T_{D(R)-M(R)}-T_{M(T)-M(R)}$; or when the information corresponds to $T_{M(T)-M(R)}$, $T_{D(T)-M(T)}$ and $T_{D(R)-M(T)}$, the parent node determines the timing offsets as $T_{D(T)-M(R)}=T_{D(T)-M(T)}+T_{M(T)-M(R)}$, $T_{D(T)-M(T)}=T_{D(T)-M(T)}$, $T_{D(R)-M(R)}=T_{D(R)-M(T)}+T_{M(T)-M(R)}$ and $T_{D(R)-M(T)}=T_{D(R)-M(T)}$; or when the information corresponds to $T_{M(T)-M(R)}$, $T_{D(T)-M(T)}$ and $T_{D(R)-D(T)}$, the parent node determines the timing offsets as $T_{D(T)-M(R)}=-T_{D(R)-D(T)}+T_{D(R)-M(T)}+T_{M(T)-M(R)}$, $T_{D(T)-M(T)}=-T_{D(R)-D(T)}+T_{D(R)-M(T)}$, $T_{D(R)-M(R)}=T_{D(R)-M(T)}+T_{M(T)-M(R)}$ and $T_{D(R)-M(T)}=T_{D(R)-M(T)}$; or when the information corresponds to $T_{M(T)-M(R)}$, $T_{D(R)-M(T)}$ and $T_{D(R)-D(T)}$, the parent node determines the timing offsets as $T_{D(T)-M(R)}=-T_{D(R)-D(T)}+T_{D(R)-M(T)}+T_{M(T)-M(R)}$, $T_{D(T)-M(T)}=-T_{D(R)-D(T)}+T_{D(R)-M(T)}$, $T_{D(R)-M(R)}=T_{D(R)-M(T)}+T_{M(T)-M(R)}$ and $T_{D(R)-M(T)}=T_{D(R)-M(T)}$; or when the information corresponds to $T_{D(T)-M(R)}$, $T_{D(R)-M(R)}$ and $T_{D(T)-M(T)}$, the parent node determines the timing offsets as $T_{D(T)-M(R)}=T_{D(T)-M(R)}$, $T_{D(T)-M(T)}=T_{D(T)-M(T)}$, $T_{D(R)-M(R)}=T_{D(R)-M(R)}$ and $T_{D(R)-M(T)}=T_{D(R)-M(R)}-T_{D(T)-M(R)}+T_{D(T)-M(T)}$; or when the information corresponds to $T_{D(T)-M(R)}$, $T_{D(R)-M(R)}$ and $T_{D(R)-M(T)}$, the parent node determines the timing offsets as $T_{D(T)-M(R)}=T_{D(T)-M(R)}$, $T_{D(T)-M(T)}=T_{D(T)-M(R)}-T_{D(R)-M(R)}+T_{D(R)-M(T)}$, $T_{D(R)-M(R)}=T_{D(R)-M(R)}$ and $T_{D(R)-M(T)}=T_{D(R)-M(T)}$; or when the information corresponds to $T_{D(T)-M(R)}$, $T_{D(T)-M(T)}$ and $T_{D(R)-M(T)}$, the parent node determines the timing offsets as $T_{D(T)-M(R)}=T_{D(T)-M(R)}$, $T_{D(T)-M(T)}=T_{D(T)-M(T)}$, $T_{D(R)-M(R)}=T_{D(R)-M(T)}-T_{D(T)-M(T)}+T_{D(T)-M(R)}$ and $T_{D(R)-M(T)}=T_{D(R)-M(T)}$; or when the information corresponds to $T_{D(T)-M(R)}$, $T_{D(T)-M(T)}$ and $T_{D(R)-D(T)}$, the parent node determines the timing offsets as $T_{D(T)-M(R)}=T_{D(T)-M(R)}$, $T_{D(T)-M(T)}=T_{D(T)-M(T)}$, $T_{D(R)-M(R)}=T_{D(R)-D(T)}+T_{D(T)-M(R)}$ and $T_{D(R)-M(T)}=T_{D(R)-D(T)}+T_{D(T)-M(T)}$; or when the information corresponds to $T_{D(T)-M(R)}$, $T_{D(R)-M(T)}$ and $T_{D(R)-D(T)}$, the parent node determines the timing offsets as $T_{D(T)-M(R)}=T_{D(T)-M(R)}$, $T_{D(T)-M(T)}=-T_{D(R)-D(T)}+T_{D(R)-M(T)}$, $T_{D(R)-M(R)}=T_{D(R)-D(T)}+T_{D(T)-M(R)}$ and $T_{D(R)-M(T)}=T_{D(R)-M(T)}$; or when the information corresponds to $T_{D(R)-M(R)}$, $T_{D(T)-M(T)}$ and $T_{D(R)-M(T)}$, the parent node determines the timing offsets as $T_{D(T)-M(R)}=T_{D(T)-M(T)}-T_{D(R)-M(T)}+T_{D(R)-M(R)}$, $T_{D(T)-M(T)}=T_{D(T)-M(T)}$, $T_{D(R)-M(R)}=T_{D(R)-M(R)}$ and $T_{D(R)-M(T)}=T_{D(R)-M(T)}$; or when the information corresponds to $T_{D(R)-M(R)}$, $T_{D(T)-M(T)}$ and $T_{D(R)-D(T)}$, the parent node determines the timing offsets as $T_{D(T)-M(R)}=-T_{D(R)-D(T)}+T_{D(R)-M(R)}$, $T_{D(T)-M(T)}=T_{D(T)-M(T)}$, $T_{D(R)-M(R)}=T_{D(R)-M(R)}$ and $T_{D(R)-M(T)}=T_{D(R)-D(T)}+T_{D(T)-M(T)}$; or when the information corresponds to $T_{D(R)-M(R)}$, $T_{D(R)-M(T)}$ and $T_{D(R)-D(T)}$, the parent node determines the timing offsets as $T_{D(T)-M(R)}=-T_{D(R)-D(T)}+T_{D(R)-M(R)}$, $T_{D(T)-M(T)}=T_{D(R)-D(T)}+T_{D(R)-M(T)}$, $T_{D(R)-M(R)}=T_{D(R)-M(R)}$ and $T_{D(R)-M(T)}=T_{D(R)-M(T)}$.

43. The parent IAB node of any one of embodiments 34 to 36, wherein the one or more timing offsets corresponds to a timing difference, ΔT, between one of the DU frame and/or slot timings or one of the MT frame and/or slot timings and a reference time.

44. The parent IAB node of embodiment 43, wherein the one or more timing offsets corresponds to:

$\Delta T_{M(T)}$, $\Delta T_{M(R)}$, $\Delta T_{D(T)}$ and $\Delta T_{D(R)}$, wherein M(T) corresponds to the MT uplink transmission frame and/or slot timing; M(R) corresponds to MT downlink reception; D(T) corresponds to DU downlink transmission; and D(R) corresponds to DU uplink reception, and the parent node determines:

the offset between DU downlink transmission and MT downlink reception, denoted as $T_{D(T)-M(R)}=\Delta T_{D(T)}-\Delta T_{M(R)}$;

the offset between DU downlink transmission and MT uplink transmission is denoted as $T_{D(T)-M(T)}=\Delta T_{D(T)}-\Delta T_{M(T)}$.

the offset between DU uplink reception and MT downlink reception is denoted as $T_{D(R)-M(R)}=\Delta T_{D(R)}-\Delta T_{M(R)}$; and the offset between DU uplink reception and MT uplink transmission is denoted as $T_{D(R)-M(T)}=\Delta T_{D(R)}-\Delta T_{M(T)}$.

45. The parent IAB node of any one of embodiments 34 to 44, wherein the one or more timing offsets have orthogonal frequency-division multiplexing, OFDM, symbol granularity.

46. The parent IAB node of any one of embodiments 34 to 45, further configured to add one symbol to each determined timing offset.

47. The parent IAB node of any one of embodiments 34 to 46, wherein the information is obtained by the parent node via signalling from the IAB node.

48. The parent IAB node of any one of embodiments 34 to 47, wherein the parent node comprises a donor IAB node.

49. A computer program comprising instructions which when executed on a computer or processing circuitry cause the computer or processing circuitry to execute any one of the methods of the preceding embodiments.

50. A computer storage medium or carrier comprising a computer program according to embodiment 49.

The invention claimed is:

1. A method, performed by an integrated access and backhaul (IAB) node, the method comprising:
    determining one or more timing offset for a time resource, the offset being in relation to a mobile termination (MT) and a distributed unit (DU) resource of the IAB node,
    providing to a parent IAB node, information related to the one or more timing offset of the IAB node, wherein the one or more timing offset have orthogonal frequency-division multiplexing (OFDM) symbol granularity,
    wherein the one or more timing offset comprises at least one of the following:
        an offset between a DU downlink transmission and an MT downlink reception;
        an offset between a DU downlink transmission and an MT uplink transmission;
        an offset between a DU uplink reception and an MT downlink reception; and
        an offset between a DU uplink reception and an MT uplink transmission.

2. The method of claim 1, wherein the one or more timing offset is in relation to a frame or slot timing of the MT and DU resources.

3. The method of claim 1, wherein the information related to the one or more timing offset corresponds to a timing difference between one of the DU resources or one of the MT resources and any one of the other DU or MT resources.

4. The method of claim 1, further comprising:
    obtaining a set of timing quantities which are indicative of one or more timing offset between an MT resource and a DU resource of the IAB node.

5. A method performed by a parent integrated access and backhaul (IAB) node, wherein the parent IAB node is a first IAB node serving a second IAB node, for scheduling downlink and uplink transmissions between the parent IAB node and the second IAB node, the method comprising:
    obtaining information related to one or more timing offset between mobile termination (MT) resources and distributed unit (DU) resources of the second IAB node, wherein the one or more timing offset has orthogonal frequency-division multiplexing (OFDM) symbol granularity;
    scheduling at least one of uplink transmissions or downlink transmissions at the second IAB node, based on the received information,
    wherein the one or more timing offset comprises at least one of the following:
        an offset between a DU downlink transmission and an MT downlink reception;
        an offset between a DU downlink transmission and an MT uplink transmission;
        an offset between a DU uplink reception and an MT downlink reception; and
        an offset between a DU uplink reception and an MT uplink transmission.

6. The method of claim 5, wherein the one or more timing offset is in relation to a frame or slot timing of the MT and DU resources.

7. The method of claim 5, further comprising the parent IAB node determining one or more timing offset between the MT resource timings and the DU resource timings of the second IAB node based, at least partly, on the obtained information related to the one or more timing offset.

8. The method of claim 5, wherein the parent IAB node adds one symbol to each determined timing offset.

9. The method of claim 5, wherein the information is obtained by the parent IAB node via signalling from the second IAB node.

10. An integrated access and backhaul (IAB) node comprising a mobile termination (MT) and a radio interface distributed unit (DU), wherein the MT terminates the radio interface layers of a backhaul interface towards a parent IAB node and the DU interfaces user equipment (UE) and/or MTs of another IAB node, the IAB node comprising:
    transceiver circuitry; and
    processing circuitry configured to:
        determine one or more timing offset for a time resource, the offset being in relation to an MT and a DU resource of the IAB node, and
        provide information to the parent IAB node via the transceiver circuitry, the information being related to the one or more timing offset of the IAB node, wherein the one or more timing offset has orthogonal frequency-division multiplexing (OFDM) symbol granularity,
    wherein the one or more timing offset comprises at least one of the following:
        an offset between a DU downlink transmission and an MT downlink reception;
        an offset between a DU downlink transmission and an MT uplink transmission;
        an offset between a DU uplink reception and an MT downlink reception; and
        an offset between a DU uplink reception and an MT uplink transmission.

11. A parent integrated access and backhaul (IAB) node, wherein a parent IAB node is a first IAB node serving a second IAB node, the parent IAB node comprising:
    transceiver circuitry; and
    processing circuitry configured to:
        obtain information related to one or more timing offset between mobile termination (MT) resources and distributed unit (DU) resources of the second IAB node via the transceiver circuitry, wherein the one or more timing offset has orthogonal frequency-division multiplexing (OFDM) symbol granularity;
        schedule uplink or downlink transmissions at the second IAB node based on the one or more timing offset,
    wherein the one or more timing offset comprises at least one of the following
        an offset between a DU downlink transmission and an MT downlink reception;

an offset between a DU downlink transmission and an MT uplink transmission;
an offset between a DU uplink reception and an MT downlink reception; and
an offset between a DU uplink reception and an MT uplink transmission.

\* \* \* \* \*